US009790795B2

(12) United States Patent
Fukami

(10) Patent No.: US 9,790,795 B2
(45) Date of Patent: Oct. 17, 2017

(54) WIND TURBINE BLADE, WIND POWER GENERATION SYSTEM INCLUDING THE SAME, AND METHOD FOR DESIGNING WIND TURBINE BLADE

(75) Inventor: Koji Fukami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 851 days.

(21) Appl. No.: 13/825,912

(22) PCT Filed: Oct. 20, 2011

(86) PCT No.: PCT/JP2011/074176
§ 371 (c)(1),
(2), (4) Date: Mar. 25, 2013

(87) PCT Pub. No.: WO2012/053602
PCT Pub. Date: Apr. 26, 2012

(65) Prior Publication Data
US 2013/0183159 A1 Jul. 18, 2013

(30) Foreign Application Priority Data

Oct. 22, 2010 (JP) ................................. 2010-238038
Oct. 22, 2010 (JP) ................................. 2010-238039
(Continued)

(51) Int. Cl.
*F01D 5/14* (2006.01)
*F03D 1/06* (2006.01)

(52) U.S. Cl.
CPC ............. *F01D 5/14* (2013.01); *F03D 1/0633* (2013.01); *F03D 1/0641* (2013.01);
(Continued)

(58) Field of Classification Search
CPC ........ F01D 5/14; F03D 1/0641; F03D 1/0633; F05B 2240/30; Y02E 10/721; Y10T 29/49336
(Continued)

(56) References Cited

U.S. PATENT DOCUMENTS 4,519,746 A * 5/1985 Wainauski .............. B64C 11/18
416/223 R
4,773,825 A * 9/1988 Rodde ..................... B64C 11/18
416/223 R
(Continued)

FOREIGN PATENT DOCUMENTS

CA 2793780 A1 12/2003
EP 0113466 A1 7/1984
(Continued)

OTHER PUBLICATIONS

Decision to Grant a Patent mailed Dec. 2, 2014, corresponding to Japanses patent application No. 2010-238042.
(Continued)

Primary Examiner — Jason T Newton
(74) Attorney, Agent, or Firm — Kanesaka Berner and Partners LLP

(57) ABSTRACT

A wind turbine blade includes a blade body whose chord length increases from a blade tip toward a blade root. The blade body includes a blade tip region located near the blade tip and whose chord length increases gradually toward the blade root, the blade tip region having a substantially constant first design lift coefficient, a maximum-chord-length position located near the blade root and having a maximum chord length, the maximum-chord-length position having a second design lift coefficient higher than the first design lift coefficient, and a transition region located between the blade tip region and the maximum-chord-length position. The transition region has a design lift coefficient
(Continued)

increasing gradually from the first design lift coefficient to the second design lift coefficient in a direction from the blade tip toward the blade root.

37 Claims, 28 Drawing Sheets

(30) Foreign Application Priority Data

| | | |
|---|---|---|
| Oct. 22, 2010 | (JP) | 2010-238040 |
| Oct. 22, 2010 | (JP) | 2010-238042 |
| Oct. 22, 2010 | (JP) | 2010-238043 |

(52) U.S. Cl.
CPC ......... *F05B 2240/30* (2013.01); *Y02E 10/721* (2013.01); *Y10T 29/49336* (2015.01)

(58) Field of Classification Search
USPC .................. 416/223 R; 415/58.3, 58.4, 57.4
See application file for complete search history.

(56) References Cited

U.S. PATENT DOCUMENTS

| | | | |
|---|---|---|---|
| 5,417,548 A | 5/1995 | Tangler et al. | |
| 5,474,425 A | 12/1995 | Lawlor | |
| 6,503,058 B1 * | 1/2003 | Selig | F03D 1/0641 416/223 R |
| 2006/0099076 A1 | 5/2006 | Wobben | |
| 2007/0036657 A1 * | 2/2007 | Wobben | F03D 1/0641 416/223 R |
| 2008/0166235 A1 | 7/2008 | Standish et al. | |
| 2009/0123289 A1 * | 5/2009 | Tangler | F01D 5/141 416/223 R |
| 2009/0202354 A1 | 8/2009 | Godsk et al. | |
| 2010/0316500 A1 * | 12/2010 | Blanton | F03D 1/0641 416/223 R |
| 2011/0262281 A1 * | 10/2011 | Petsche | F03D 1/0641 416/223 R |
| 2012/0280509 A1 * | 11/2012 | Fukami | F03D 1/0633 290/55 |
| 2013/0115098 A1 * | 5/2013 | Madsen | F03D 1/0641 416/241 R |

FOREIGN PATENT DOCUMENTS

| | | |
|---|---|---|
| EP | 0675285 A1 | 10/1995 |
| EP | 1152148 A1 | 11/2001 |
| EP | 1760310 A1 | 3/2007 |
| GB | 647159 A | 12/1950 |
| JP | 58-026699 A | 2/1983 |
| JP | 6-027499 U | 4/1994 |
| JP | 2004-084522 A | 3/2004 |
| JP | 2009-293622 A | 12/2009 |
| JP | 2010-043650 A | 2/2010 |
| WO | 2007010329 A1 | 1/2007 |
| WO | 2009062159 A1 | 5/2009 |

OTHER PUBLICATIONS

Decision to Grant a Patent mailed Jun. 3, 2014, corresponds to Japanese patent application No. 2010-238038.
Decision to Grant a Patent mailed Jun. 3, 2014, corresponds to Japanese patent application No. 2010-238039.
Decision to Grant a Patent mailed Nov. 12, 2013, corresponds to Japanese patent application No. 2010-238040.
Decision to Grant a Patent mailed Nov. 12, 2013, corresponds to Japanese patent application No. 2010-238043.
International Search Report and Written Opinion corresponding to PCT/JP2011/074176, dated Jan. 31, 2012.
Extended European Search Report dated Apr. 9, 2015, corresponding to European patent application No. 11834441.5.
Notification on the Grant of Patent Right mailed Jan. 19, 2016, in Chinese Patent Application No. 201180042131.0.
Decision to Grant a Patent in EP Patent Application No. 11834441.5, mailed Nov. 24, 2016.

* cited by examiner

WIND TURBINE BLADE, WIND POWER GENERATION SYSTEM INCLUDING THE SAME, AND METHOD FOR DESIGNING WIND TURBINE BLADE

RELATED APPLICATIONS

The present application is a National Phase of International Application Number PCT/JP2011/074176, filed Oct. 20, 2011, and claims priority from Japanese Application Number 2010-238043, filed Oct. 22, 2010, Japanese Application Number 2010-238042, filed Oct. 22, 2010, Japanese Application Number 2010-238040, filed Oct. 22, 2010, Japanese Application Number 2010-238039, filed Oct. 22, 2010, Japanese Application Number 2010-238038, filed Oct. 22, 2010.

TECHNICAL FIELD

The present invention relates to wind turbine blades, wind power generation systems including wind turbine blades, and methods for designing wind turbine blades.

BACKGROUND ART

Recently, attention has been focused on wind power generation systems as a clean energy source that emits no greenhouse gases during power generation. In a wind power generation system, wind turbine blades rotate axially by means of wind force, and the rotational force is converted into electricity to produce electrical output power.

The electrical output power of the wind power generation system is expressed as the product of the shaft-end output power (output power generated by the blades) and the conversion efficiency (efficiency of components, such as a bearing and a generator). The shaft-end output power is expressed by the following equation, indicating that blades having a higher efficiency and a larger diameter generate more electricity:

$$\text{Shaft-end output power} = \frac{1}{2} \times \text{air density} \times \text{wind speed}^3 \times \text{blade efficiency} \times \pi \times (\text{blade diameter}/2)^2$$

The blade efficiency is limited to about 0.5 because of the theoretical upper limit (Betz limit=0.593) and, in practice, the wake effect and the air resistance of the blades. It is therefore difficult to achieve any significant improvement in blade efficiency.

To generate more electricity, it is effective to increase the blade diameter because the output power depends on the square of the blade diameter. A larger blade diameter, however, results in a higher aerodynamic load (the thrust acting in the inflow direction and the moment transferred to the blade roots), which poses the possibility or tendency of increasing the size, the weight, and consequently the cost of equipment, such as a rotor head, a nacelle, and a tower. Accordingly, there is a need for a technique for designing a longer blade without substantially increasing the aerodynamic load on the blade. To circumvent the problem of the increased load, one aerodynamically (geometrically) possible approach is to reduce the projected area of the blades by reducing the chord length (the length of the blade chord) (i.e., by increasing the aspect ratio or decreasing the solidity), thereby reducing the aerodynamic load.

Here, the aspect ratio and the solidity are expressed by the following equations:

$$\text{Aspect ratio} = \text{blade length}^2/\text{projected area of blade} \qquad (1)$$

$$\text{Solidity} = \text{total projected area of blades/sweep area of blades} = (\text{number of blades} \times \text{mean chord length})/(\pi \times (\text{blade diameter}/2)^2) \qquad (2)$$

In general, a wind turbine blade has a certain optimum chord length for a certain tip speed ratio, as expressed by the following equation (Wind Energy Handbook, John Wiley & Sons, p. 378):

$$Copt/R \times \lambda^2 \times CLdesign \times r/R \approx 16/9 \times \pi/n \qquad (3)$$

where Copt is the optimum chord length, R (blade radius) is one half of the blade diameter, $\lambda$ is the design tip speed ratio, CLdesign is the design lift coefficient, r is the radial position of the blade section, and n is the number of blades.

The design tip speed ratio is the blade tip speed divided by the infinite upstream wind speed. The design lift coefficient is the lift coefficient at the angle of attack at which the airfoil (blade section) has the maximum lift-to-drag ratio (lift/drag) and is determined by the (aerodynamic) profile of the airfoil (blade section) and the inflow conditions (Reynolds number).

FIG. 26 illustrates the definition of the Reynolds number used herein. As shown in the figure, the Reynolds number of a wind turbine, which takes into account the relative wind speed in a certain cross-section A-A of a blade that rotates at a certain rotational speed, is expressed by the following equation:

Reynolds number = air density × relative wind speed for blade section × chord length of blade section/viscosity coefficient of air To maintain the aerodynamic efficiency of a blade, it is desirable that the airfoil (blade section) have the following characteristics:

1. High design lift coefficient
2. Optimum "combination" of design lift coefficients, where the "combination" of design lift coefficients refers to a combination of design lift coefficients of a series of airfoils (airfoil series, family, or set) with different thickness ratios (the percentage obtained by dividing the maximum thickness by the chord length) applied to one wind turbine blade. An example of a combination of thickness ratios of airfoils applied to a wind turbine is 12%, 15%, 18%, 21%, 24%, 30%, 36%, and 42%.

PTL 1 below discloses a series of airfoils for improved wind turbine output power. Specifically, it discloses a series of airfoils having thickness ratios ranging from 14% to 45% and design lift coefficients ranging from 1.10 to 1.25 (see claim 1).

PTL 2 below specifies the profile of the leading edge to reduce a performance drop due to the roughness of the leading edge (e.g., debris and scratches on the leading edge and manufacturing errors). Specifically, it specifies that the percentage obtained by dividing the distance from the chord on the suction side, at a 2% position, by the chord length, where the position of the leading edge along the chord length is defined as 0% and the position of the trailing edge along the chord length is defined as 100%, be 7% to 9%.

CITATION LIST

Patent Literature

{PTL 1}
Specification of European Patent Application, Publication No. 1152148
{PTL 2}
PCT International Publication No. WO 2007/010329

SUMMARY OF INVENTION

Technical Problem

However, even if the desired design lift coefficients are determined, as in PTL 1, there is currently no systematic procedure for specifying the airfoil shapes for achieving such design lift coefficients.

An airfoil shape is determined using the suction-side convexity YS and the pressure-side convexity YP. Here, the suction-side convexity YS is the percentage obtained by dividing the distance from the chord on the suction side, at the maximum-thickness position, by the chord length. The pressure-side convexity YP is the percentage obtained by dividing the distance from the chord on the pressure side, at the maximum-thickness position, by the chord length.

However, the relationship between the suction-side convexity YS and the pressure-side convexity YP and the design lift coefficient is not discussed.

As is obvious from equation (3) above, if the profile near the blade root (i.e., on the side where the radial position is smaller) is determined while maintaining the desired design lift coefficient, the optimum chord length near the blade root needs to be increased in inverse proportion to the radial position. In practice, however, there is a maximum allowable chord length near the blade root in terms of transportation of wind turbine blades.

Although PTL 1 above discloses a suitable combination of design lift coefficients in terms of wind turbine output power, design lift coefficients ranging from 1.10 to 1.25 are also specified near the blade root, where the thickness ratio exceeds 30%, which results in an excessive chord length and thus makes it difficult to transport wind turbine blades.

Even if a chord length that is allowable in terms of transportation is applied at the blade root side, the airfoil shapes (e.g., the combination of design lift coefficients) need to be determined taking into account the aerodynamic performance of the wind turbine blades. In the related art, however, it is not discussed what airfoil shapes should be applied at the transition region between the blade tip region and the maximum-chord-length position, where different design lift coefficients have to be applied for reasons such as transportation, if the desired design lift coefficient is applied at the blade tip region.

That is, even if the desired design lift coefficient is determined for each thickness ratio, as in PTL 1, it is not specifically discussed what airfoil profile (blade section profile) is defined at each thickness ratio in the longitudinal direction of the wind turbine blade when designing the wind turbine blade. Also, the airfoil profile at each thickness ratio needs to be considered taking into account actual fabrication. Here, the airfoil profile (blade section profile) refers to the profile of a cross-section (FIG. 2), taken at a certain radial position, of a three-dimensional blade, normalized by defining the leading edge as the origin (0,0) and the trailing edge as the point (1,0) (FIG. 3).

Accordingly, there is room for improvement in the aerodynamic performance of a thick portion located closer to the blade root than to the blade tip region (the portion thicker than the tip region, which is the region extending from the transition region to the maximum-chord-length position).

FIG. 3 of PTL 1 discloses airfoils (baseline, 2b, 3a, and 3b) having design lift coefficients varying from 1.25 to 1.45 in the direction from the blade tip (Station 4) toward the blade root (Station 1). That is, it discloses airfoils having higher lift coefficients near the blade root than near the blade tip so that the chord length is smaller. These airfoils, however, have increased design lift coefficients at the thin portion, i.e., at positions having thickness ratios ranging from 21% to 30%. The positions having thickness ratios ranging from 21% to 30% correspond to radial positions where large wind force is exerted; it is inappropriate in terms of aerodynamic characteristics to change the design lift coefficient at such radial positions.

As in PTL 2, on the other hand, it is known that an airfoil is defined by specifying the distance between the suction side and the chord at the leading edge. PTL 2, however, specifies the distance between the suction side and the chord taking into account the roughness of the leading edge; it does not disclose the relationship between the distance and the design lift coefficient.

Even if the desired design lift coefficient can be determined for improved wind turbine output power, as in PTL 1, and the performance drop due to roughness can be reduced, as in PTL 2, the following problem still remains.

In general, the maximum lift-to-drag ratio and the maximum lift coefficient are used for blade performance evaluation. For wind turbine blades, the maximum lift-to-drag ratio is a parameter that affects the blade aerodynamic performance during variable-speed operation of the wind turbine (design point). The maximum lift coefficient is a parameter that affects the blade aerodynamic performance during the transition state after the wind turbine reaches the maximum rotational speed and before it reaches the rated output power. It is therefore important for wind turbine blades to improve both the maximum lift-to-drag ratio and the maximum lift coefficient.

Even if the wind turbine blades deliver the desired aerodynamic performance, they would adversely affect the surrounding environment where the wind turbine is installed unless the aerodynamic noise of the wind turbine blades is taken into account at the same time.

In light of the foregoing, the present invention provides a wind turbine blade having the desired design lift coefficients, a wind power generation system including such a wind turbine blade, and a method for designing a wind turbine blade.

The present invention also provides a wind turbine blade that delivers the desired aerodynamic characteristics under conditions where the upper limit of the chord length near the blade root is limited for reasons such as transportation, a wind power generation system including such a wind turbine blade, and a method for designing a wind turbine blade.

The present invention also provides a wind turbine blade that delivers the desired aerodynamic characteristics at each thickness ratio, a wind power generation system including such a wind turbine blade, and a method for designing a wind turbine blade.

The present invention also provides a wind turbine blade that delivers high performance and low noise with design lift coefficients suitable for improving the maximum lift-to-drag ratio and maximum lift coefficient, a wind power generation system including such a wind turbine blade, and a method for designing a wind turbine blade.

Solution to Problem

To solve the above problems, wind turbine blades of the present invention and methods for designing the wind turbine blades employ the following solutions.

A wind turbine blade according to a first aspect of the present invention includes a blade body whose chord length increases from a blade tip toward a blade root. The blade body includes a blade tip region located near the blade tip and whose chord length increases gradually toward the blade root, the blade tip region having a substantially constant first design lift coefficient, a maximum-chord-length position located near the blade root and having a maximum chord length, the maximum-chord-length position having a second design lift coefficient higher than the first design lift coefficient, and a transition region located between the blade tip region and the maximum-chord-length position, and the transition region has a design lift coefficient increasing gradually from the first design lift coefficient to the second design lift coefficient in a direction from the blade tip toward the blade root.

The wind turbine blade according to the first aspect of the present invention includes the blade body whose chord length increases from the blade tip toward the blade root, and the blade body includes the blade tip region whose chord length increases toward the blade root, the maximum-chord-length position located near the blade root and having the maximum chord length, and the transition region located between the blade tip region and the maximum-chord-length position.

The blade tip region, which receives a larger wind force and therefore produces a higher output power, has a substantially constant first design lift coefficient so that the entire blade tip region delivers the desired aerodynamic characteristics. The first design lift coefficient is set to a feasible practical upper limit (e.g., about 1.15 for a thickness ratio of about 18%).

The maximum-chord-length position has a second design lift coefficient higher than the first design lift coefficient so that the maximum chord length is limited (see equation (3) above). By setting a suitable second design lift coefficient, the upper limit of the chord length at the maximum-chord-length position, which is limited for reasons such as transportation, is determined.

The transition region has a design lift coefficient increasing gradually from the first design lift coefficient to the second design lift coefficient in the direction from the blade tip toward the blade root. This allows for a reduced range of variation in design lift coefficient if the chord length is increased from the blade tip region to the maximum-chord-length position, thus avoiding a substantial loss of aerodynamic performance. In particular, the desired aerodynamic characteristics can also be maintained at the thick portion (the portion thicker than the blade tip region, which is the region extending from the transition region to the maximum-chord-length position), which has not been taken into account in the related art.

Thus, because the desired design lift coefficient is assigned to each of the blade tip region, the transition region, and the maximum-chord-length position to specify a suitable combination of design lift coefficients over the entire blade body, the wind turbine blade of the present invention can deliver the desired aerodynamic characteristics under conditions where the upper limit of the chord length near the blade root is limited. In particular, the aerodynamic performance of the thick portion located closer to the blade root than to the blade tip region can be improved.

Preferably, the design tip speed ratio (blade tip speed divided by inflow wind speed) is 6 or more (more preferably, 8.0 to 9.0), and the Reynolds number is 3,000,000 to 10,000,000.

Preferably, in the wind turbine blade according to the first aspect of the present invention, the blade tip region is provided in a range of dimensionless radial positions of 0.5 to 0.95, the dimensionless radial position being a radial position divided by a blade radius (half a blade diameter), the first design lift coefficient is $X\pm0.10$, preferably $X\pm0.05$, wherein X is a median, the second design lift coefficient of the maximum-chord-length position is $X+0.3\pm0.2$, preferably $X+0.3\pm0.1$, and the design lift coefficient of the transition region at a central position between an end of the blade tip region facing the blade root and the maximum-chord-length position is $X+0.15\pm0.15$, preferably $X+0.15\pm0.075$.

The dimensionless radius of the maximum-chord-length position is less than 0.35. For example, the dimensionless radial position of the maximum-chord-length position is about $(0.25\pm0.05)$. In this case, if the dimensionless radial position of the end of the blade tip region facing the blade root is 0.5, the dimensionless radial position of the central position of the transition region is 0.35.

Preferably, in the wind turbine blade according to the first aspect of the present invention, the blade tip region is provided in a range of dimensionless radial positions of 0.5 to 0.95, the dimensionless radial position being a radial position divided by a blade radius (half a blade diameter), the first design lift coefficient is $1.15\pm0.05$, the second design lift coefficient of the maximum-chord-length position is $1.45\pm0.1$, and the design lift coefficient of the transition region at a central position between an end of the blade tip region facing the blade root and the maximum-chord-length position is $1.30\pm0.075$.

The dimensionless radius of the maximum-chord-length position is less than 0.35. For example, the dimensionless radial position of the maximum-chord-length position is about $(0.25\pm0.05)$. In this case, if the dimensionless radial position of the end of the blade tip region facing the blade root is 0.5, the dimensionless radial position of the central position of the transition region is 0.35.

Preferably, in the wind turbine blade according to the first aspect of the present invention, the blade tip region is provided in a range of thickness ratios of 12% to 30%, the thickness ratio being the percentage obtained by dividing a maximum thickness by the chord length, the first design lift coefficient is $X\pm0.10$, preferably $X\pm0.05$, wherein X is a median, the second design lift coefficient of the maximum-chord-length position is $X+0.3\pm0.2$, preferably $X+0.3\pm0.1$, and the design lift coefficient of the transition region at a central position between an end of the blade tip region facing the blade root and the maximum-chord-length position is $X+0.15\pm0.15$, preferably $X+0.15\pm0.075$.

The thickness ratio of the maximum-chord-length position is more than 36%. For example, the thickness ratio of the maximum-chord-length position is about 42%. In this case, if the thickness ratio of the end of the blade tip region facing the blade root is 30%, the thickness ratio of the central position of the transition region is 36%.

Preferably, in the wind turbine blade according to the first aspect of the present invention, the blade tip region is provided in a range of thickness ratios of 12% to 30%, the thickness ratio being the percentage obtained by dividing a maximum thickness by the chord length, the first design lift coefficient is $1.15\pm0.05$, the second design lift coefficient of the maximum-chord-length position is $1.45\pm0.1$, and the design lift coefficient of the transition region at a central position between an end of the blade tip region facing the blade root and the maximum-chord-length position is $1.30\pm0.075$.

The thickness ratio of the maximum-chord-length position is more than 36%. For example, the thickness ratio of the maximum-chord-length position is about 42%. In this case, if the thickness ratio of the end of the blade tip region facing the blade root is 30%, the thickness ratio of the central position of the transition region is 36%.

A wind turbine blade according to a second aspect of the present invention includes a blade body whose chord length increases from a blade tip toward a blade root. If the blade body is represented by a thickness ratio and Y125, the thickness ratio being the percentage obtained by dividing a maximum thickness by the chord length, Y125 being the percentage obtained by dividing a distance from a chord on a suction side, at a 1.25% position, by the chord length, wherein the position of a leading edge along the chord length is defined as 0% and the position of a trailing edge along the chord length is defined as 100%, then the blade body has a Y125 of 2.575±0.13% at a position having a thickness ratio of 21%, a Y125 of 2.6±0.15% at a position having a thickness ratio of 24%, and a Y125 of 2.75±0.25%, preferably 2.75±0.20%, and more preferably 2.75±0.15%, at a position having a thickness ratio of 30%.

The wind turbine blade according to the second aspect of the present invention includes the blade body whose chord length increases from the blade tip toward the blade root, and the blade section profiles of the blade body are determined by Y125. This is based on the fact that there is a good correlation between the design lift coefficient and Y125. This provides a blade profile having the desired design lift coefficients.

Particularly, in the present invention, the combination of the thickness ratio and Y125 can be specified as described above to reduce variation in the design lift coefficient of blade sections having thickness ratios ranging from 21% to 30%, thereby providing the desired aerodynamic characteristics.

In addition, because Y125 is specified, a slender blade with high design lift coefficients can be provided, and therefore, the load on the wind turbine blade can be reduced. This allows the design of a longer wind turbine blade, which results in a higher level of electricity generation.

Preferably, the design tip speed ratio (blade tip speed divided by inflow wind speed) is 6 or more (more preferably, 8.0 to 9.0), and the Reynolds number is 3,000,000 to 10,000,000.

Preferably, in the wind turbine blade according to the second aspect of the present invention, Y125 of the blade body in a range of thickness ratios of 21% to 35% is determined by an interpolation curve passing through the value of Y125 at the position having a thickness ratio of 21%, the value of Y125 at the position having a thickness ratio of 24%, and the value of Y125 at the position having a thickness ratio of 30%.

In the wind turbine blade according to the second aspect of the present invention, the blade body may have a Y125 of 2.55±0.1% at a position having a thickness ratio of 18%, a Y125 of 3.0±0.4%, preferably 3.0±0.25%, and more preferably 3.0±0.20%, at a position having a thickness ratio of 36%, and a Y125 of 3.4±0.6%, preferably 3.4±0.4%, and more preferably 3.4±0.2%, at a position having a thickness ratio of 42%.

By specifying the blade sections as described above, a wind turbine blade having reduced variation in design lift coefficient over the region from the blade tip (thickness ratio of 18%) to the blade root (thickness ratio of 42%) can be provided.

Preferably, Y125 of the blade body in a range of thickness ratios of 18% to 42% is determined by an interpolation curve passing through the value of Y125 at the position having a thickness ratio of 18%, the value of Y125 at the position having a thickness ratio of 21%, the value of Y125 at the position having a thickness ratio of 24%, the value of Y125 at the position having a thickness ratio of 30%, the value of Y125 at the position having a thickness ratio of 36%, and the value of Y125 at the position having a thickness ratio of 42%.

A wind turbine blade according to a third aspect of the present invention includes a blade body whose chord length increases from a blade tip toward a blade root. If the blade body is represented by a thickness ratio and a suction-side convexity YS, the thickness ratio being the percentage obtained by dividing a maximum thickness by the chord length, the suction-side convexity YS being the percentage obtained by dividing a distance from a chord on a suction side, at a maximum-thickness position, by the chord length, then the blade body has a suction-side convexity YS of 12.0±0.6% at a position having a thickness ratio of 21%, a suction-side convexity YS of 12.3±0.7% at a position having a thickness ratio of 24%, and a suction-side convexity YS of 13.3±1.2%, preferably 13.3±1.0%, and more preferably 13.3±0.8%, at a position having a thickness ratio of 30%.

The wind turbine blade according to the third aspect of the present invention includes the blade body whose chord length increases from the blade tip toward the blade root, and the blade section profiles of the blade body are determined by the suction-side convexity YS. This is based on the fact that there is a good correlation between the design lift coefficient and the suction-side convexity YS. This provides a blade profile having the desired design lift coefficients.

Particularly, in the present invention, the combination of the thickness ratio and the suction-side convexity can be specified as described above to reduce variation in the design lift coefficient of blade sections having thickness ratios ranging from 21% to 30%, thereby providing the desired aerodynamic characteristics.

In addition, because the suction-side convexity is specified, a slender blade with high design lift coefficients can be provided, and therefore, the load on the wind turbine blade can be reduced. This allows the design of a longer wind turbine blade, which results in a higher level of electricity generation.

Preferably, the design tip speed ratio (blade tip speed divided by inflow wind speed) is 6 or more (more preferably, 8.0 to 9.0), and the Reynolds number is 3,000,000 to 10,000,000.

Preferably, in the wind turbine blade according to the third aspect of the present invention, YS of the blade body in a range of thickness ratios of 21% to 35% is determined by an interpolation curve passing through the value of YS at the position having a thickness ratio of 21%, the value of YS at the position having a thickness ratio of 24%, and the value of YS at the position having a thickness ratio of 30%.

Preferably, in the wind turbine blade according to the third aspect of the present invention, the blade body has a YS of 11.7±0.5% at a position having a thickness ratio of 18%, a YS of 14.6±2.0%, preferably 14.6±1.2%, and more preferably 14.6±1.0%, at a position having a thickness ratio of 36%, and a YS of 16.6±3.0%, preferably 16.6±2.0%, and more preferably 16.6±1.5%, at a position having a thickness ratio of 42%.

By specifying the blade sections as described above, a wind turbine blade having reduced variation in design lift coefficient over the region from the blade tip (thickness ratio of 18%) to the blade root (thickness ratio of 42%) can be provided.

Preferably, YS of the blade body in a range of thickness ratios of 18% to 42% is determined by an interpolation curve passing through the value of YS at the position having a thickness ratio of 18%, the value of YS at the position having a thickness ratio of 21%, the value of YS at the position having a thickness ratio of 24%, the value of YS at the position having a thickness ratio of 30%, the value of YS at the position having a thickness ratio of 36%, and the value of YS at the position having a thickness ratio of 42%.

A wind turbine blade according to a fourth aspect of the present invention includes a blade body whose chord length increases from a blade tip toward a blade root. If the blade body is represented by a thickness ratio and a pressure-side convexity YP, the thickness ratio being the percentage obtained by dividing a maximum thickness by the chord length, the pressure-side convexity YP being the percentage obtained by dividing a distance from a chord on a pressure side, at a maximum-thickness position, by the chord length, then the blade body has a pressure-side convexity YP of 9.0±0.6% at a position having a thickness ratio of 21%, a pressure-side convexity YP of 11.7±0.7% at a position having a thickness ratio of 24%, and a pressure-side convexity YP of 16.7±1.2%, preferably 16.7±1.0%, and more preferably 16.7±0.8%, at a position having a thickness ratio of 30%.

The wind turbine blade according to the fourth aspect of the present invention includes the blade body whose chord length increases from the blade tip toward the blade root, and the blade section profiles of the blade body are determined by the pressure-side convexity YP. This is based on the fact that there is a good correlation between the design lift coefficient and the pressure-side convexity YP. This provides a blade profile having the desired design lift coefficients.

Particularly, in the present invention, the combination of the thickness ratio and the pressure-side convexity can be specified as described above to reduce variation in the design lift coefficient of blade sections having thickness ratios ranging from 21% to 30%, thereby providing the desired aerodynamic characteristics.

In addition, because the pressure-side convexity is specified, a slender blade with high design lift coefficients can be provided, and therefore, the load on the wind turbine blade can be reduced. This allows the design of a longer wind turbine blade, which results in a higher level of electricity generation.

Preferably, the design tip speed ratio (blade tip speed divided by inflow wind speed) is 6 or more (more preferably, 8.0 to 9.0), and the Reynolds number is 3,000,000 to 10,000,000.

Preferably, in the wind turbine blade according to the fourth aspect of the present invention, YP of the blade body in a range of thickness ratios of 21% to 35% is determined by an interpolation curve passing through the value of YP at the position having a thickness ratio of 21%, the value of YP at the position having a thickness ratio of 24%, and the value of YP at the position having a thickness ratio of 30%.

In the wind turbine blade according to the fourth aspect of the present invention, the blade body may have a YP of 6.3±0.5% at a position having a thickness ratio of 18%, a YP of 21.4±2.0%, preferably 21.4±1.2%, and more preferably 21.4±1.0%, at a position having a thickness ratio of 36%, and a YP of 25.4±3.0%, preferably 25.4±2.0%, and more preferably 25.4±1.5%, at a position having a thickness ratio of 42%.

By specifying the blade sections as described above, a wind turbine blade having reduced variation in design lift coefficient over the region from the blade tip (thickness ratio of 18%) to the blade root (thickness ratio of 42%) can be provided.

Preferably, YP of the blade body in a range of thickness ratios of 18% to 42% is determined by an interpolation curve passing through the value of YP at the position having a thickness ratio of 18%, the value of YP at the position having a thickness ratio of 21%, the value of YP at the position having a thickness ratio of 24%, the value of YP at the position having a thickness ratio of 30%, the value of YP at the position having a thickness ratio of 36%, and the value of YP at the position having a thickness ratio of 42%.

A wind turbine blade according to a fifth aspect of the present invention includes a blade body whose chord length decreases from a blade root toward a blade tip in a radial direction, and an airfoil profile (blade section profile) of the blade body at each radial position has a suction-side profile that is extended or contracted in a Y direction perpendicular to a chordwise direction.

Because the airfoil profile (blade section profile) at each radial position has a suction-side profile that is extended or contracted in the Y direction, a wind turbine blade that delivers the desired aerodynamic performance at each radial position can be provided.

As used herein, the term "extended or contracted" may refer to a profile that is practically extended or contracted as long as the desired aerodynamic performance is delivered.

A wind turbine blade according to a sixth aspect of the present invention includes a blade body whose chord length decreases from a blade root toward a blade tip in a radial direction, and an airfoil profile (blade section profile) of the blade body at each radial position has a chordwise thickness distribution that is extended or contracted in a Y direction.

Because the airfoil profile (blade section profile) at each radial position has a thickness distribution that is extended or contracted in the Y direction, a wind turbine blade that delivers the desired aerodynamic performance at each radial position can be provided.

Preferably, the extension/contraction ratio is the ratio of the thickness ratio, which is the maximum thickness divided by the chord length.

A wind turbine blade according to a seventh aspect of the present invention includes a blade body whose chord length decreases from a blade root toward a blade tip in a radial direction, and an airfoil profile (blade section profile) of the blade body at each radial position has a suction-side profile that is extended or contracted in a Y direction and a chordwise thickness distribution that is extended or contracted in the Y direction.

Because the airfoil profile (blade section profile) at each radial position has a suction-side profile and a thickness distribution that are extended or contracted in the Y direction, a wind turbine blade that delivers the desired aerodynamic performance at each radial position can be provided.

Preferably, the extension/contraction ratio of the thickness distribution is the ratio of the thickness ratio, which is the maximum thickness divided by the chord length.

A wind turbine blade according to an eighth aspect of the present invention includes a blade body whose chord length decreases from a blade root toward a blade tip in a radial direction. An airfoil profile (blade section profile) of the blade body at each radial position has a suction-side profile that is extended or contracted in a Y direction, and a leading edge portion, extending from a leading edge to a maximum-thickness position, of the airfoil profile (blade section profile) of the blade body at each radial position has a chordwise thickness distribution that is extended or contracted in the Y direction and a pressure-side profile determined from the thickness distribution and the suction-side profile.

Because the airfoil profile (blade section profile) at each radial position has a suction-side profile that is extended or contracted in the Y direction, a wind turbine blade that delivers the desired aerodynamic performance at each radial position can be provided.

In addition, because the leading edge portion of the airfoil profile (blade section profile) at each radial position has a pressure-side profile determined from the thickness distribution extended or contracted in the Y direction, a wind turbine blade that delivers the desired aerodynamic performance can be provided. The pressure surface coordinate representing the pressure-side profile (the distance between the chord position and the pressure-side profile) can be obtained by subtracting, from the suction surface coordinate of the suction-side profile (the distance between the chord position and the suction-side profile), the thickness obtained from the thickness distribution at the corresponding chord position (suction surface coordinate−thickness).

In addition, a trailing edge portion extending from the maximum-thickness position toward the trailing edge may be designed with any pressure-side profile to optimize the design lift coefficient.

A wind turbine blade according to a ninth aspect of the present invention has a blade section having a maximum-thickness position having a maximum thickness in a range of chordwise positions X/C of 0.28 to 0.32, the chordwise position X/C being a distance X, from a leading edge along a chord line, divided by a chord length C, and a maximum-camber position having a maximum camber in a range of chordwise positions X/C of 0.45 to 0.55.

After conducting research on blade sections of wind turbine blades through various numerical calculations and wind tunnel tests, the inventors have found that the following combination provides high performance (i.e., the optimum range of design lift coefficients) and low aerodynamic noise (i.e., a smaller boundary layer thickness at the trailing edge).

A maximum-thickness position located farther forward (closer to the leading edge), i.e., in a range of chordwise positions X/C of 0.28 to 0.32 (more preferably, 0.29 to 0.31), tends to result in a higher design lift coefficient, a higher maximum lift-to-drag ratio, and a smaller boundary layer thickness at the trailing edge than a maximum-thickness position located farther backward.

In addition, a forward camber, in which the maximum-camber position is located closer to the leading edge than the center of the blade chord, tends to result in a higher maximum lift-to-drag ratio and a smaller boundary layer thickness at the trailing edge than a backward camber, although the maximum lift coefficient tends to be lower. A backward camber, on the other hand, tends to result in a higher maximum lift coefficient, although the maximum lift-to-drag ratio tends to be lower. Thus, because there is a trade-off between forward and backward cambers, the maximum-camber position is set in a range of chordwise positions X/C of 0.45 to 0.55 so that the camber is midway between forward and backward cambers.

The above combination provides a wind turbine blade having high performance and low noise.

Preferably, the design tip speed ratio (blade tip speed divided by inflow wind speed) is 6 or more (more preferably, 8.0 to 9.0), and the Reynolds number is 3,000,000 to 10,000,000.

In the wind turbine blade according to the ninth aspect of the present invention, the camber distribution may be substantially symmetrical with respect to the maximum-camber position in the chordwise direction.

A camber distribution symmetrical with respect to the maximum-camber position in the chordwise direction has the advantages of both of a forward camber and a backward camber, thus providing a higher maximum lift-to-drag ratio and a higher maximum lift coefficient.

In the wind turbine blade according to the ninth aspect of the present invention, the blade section may be provided at a wind turbine blade end in a range of thickness ratios of 12% to 21%, the thickness ratio being the maximum thickness divided by the chord length.

By providing the above blade section in a range of thickness ratios of 12% to 21%, which functions as the main portion for converting wind force to the rotation of the wind turbine blade, a wind turbine blade having high performance and low noise can be provided.

A wind power generation system according to a tenth aspect of the present invention includes the wind turbine blade according to one of the aspects described above, a rotor that is connected to the blade root of the wind turbine blade and that is rotated by the wind turbine blade, and a generator that converts the rotational force generated by the rotor to electrical output power.

The wind power generation system including the wind turbine blade described above produces a higher output power with longer blades.

A method for designing a wind turbine blade according to an eleventh aspect of the present invention is a method for designing a wind turbine blade including a blade body whose chord length increases from a blade tip toward a blade root. The method includes assigning a substantially constant first design lift coefficient to a blade tip region located near the blade tip of the blade body and whose chord length increases gradually toward the blade root; assigning a second design lift coefficient higher than the first design lift coefficient to a maximum-chord-length position located near the blade root of the blade body and having a maximum chord length; and assigning a design lift coefficient, which increases gradually from the first design lift coefficient to the second design lift coefficient in a direction from the blade tip toward the blade root, to a transition region located between the blade tip region and the maximum-chord-length position.

The wind turbine blade includes the blade body whose chord length increases from the blade tip toward the blade root, and the blade body includes the blade tip region whose chord length increases toward the blade root, the maximum-chord-length position located near the blade root and having the maximum chord length, and the transition region located between the blade tip region and the maximum-chord-length position.

The blade tip region, which receives a larger wind force and therefore produces a higher output power, is assigned a substantially constant first design lift coefficient so that the entire blade tip region delivers the desired aerodynamic characteristics. The first design lift coefficient is set to a feasible practical upper limit (e.g., about 1.15 for a thickness ratio of about 18%).

The maximum-chord-length position is assigned a second design lift coefficient higher than the first design lift coefficient so that the maximum chord length is limited (see equation (3) above). By setting a suitable second design lift coefficient, the upper limit of the chord length at the maximum-chord-length position, which is limited for reasons such as transportation, is determined.

The transition region is assigned a design lift coefficient increasing gradually from the first design lift coefficient to the second design lift coefficient in the direction from the blade tip toward the blade root. This allows for a reduced range of variation in design lift coefficient if the chord length is increased from the blade tip region to the maximum-chord-length position, thus avoiding a substantial loss of aerodynamic performance. In particular, the desired aerodynamic characteristics can also be maintained at the thick portion (the portion thicker than the blade tip region, which is the region extending from the transition region to the maximum-chord-length position), which has not been taken into account in the related art.

Thus, because the method for designing the wind turbine blade of the present invention assigns the desired design lift coefficient to each of the blade tip region, the transition region, and the maximum-chord-length position to specify a suitable combination of design lift coefficients over the entire blade body, the wind turbine blade can deliver the desired aerodynamic characteristics under conditions where the upper limit of the chord length near the blade root is limited. In particular, the aerodynamic performance of the thick portion located closer to the blade root than to the blade tip region can be improved.

Preferably, the design tip speed ratio (blade tip speed divided by inflow wind speed) is 6 or more (more preferably, 8.0 to 9.0), and the Reynolds number is 3,000,000 to 10,000,000.

A method for designing a wind turbine blade according to a twelfth aspect of the present invention is a method for designing a wind turbine blade including a blade body whose chord length increases from a blade tip toward a blade root. The method includes a design-lift-coefficient determining step of determining a predetermined design lift coefficient at each blade section of the blade body; and a Y125-determining step of determining Y125 such that the design lift coefficient determined in the design-lift-coefficient determining step is satisfied. Y125 is the percentage obtained by dividing a distance from a chord on a suction side, at a 1.25% position, by the chord length, wherein the position of a leading edge along the chord length is defined as 0% and the position of a trailing edge along the chord length is defined as 100%.

After conducting extensive research, the inventors have found that there is a strong correlation between the design lift coefficient and Y125. Accordingly, in the present invention, Y125 is determined such that a predetermined design lift coefficient is satisfied, thereby providing a wind turbine blade having the desired aerodynamic characteristics.

A method for designing a wind turbine blade according to a thirteenth aspect of the present invention is a method for designing a wind turbine blade including a blade body whose chord length increases from a blade tip toward a blade root. The method includes a design-lift-coefficient determining step of determining a predetermined design lift coefficient at each blade section of the blade body; and a YS-determining step of determining a suction-side convexity YS such that the design lift coefficient determined in the design-lift-coefficient determining step is satisfied. The suction-side convexity YS is the percentage obtained by dividing a distance from a chord on a suction side, at a maximum-thickness position, by the chord length.

After conducting extensive research, the inventors have found that there is a strong correlation between the design lift coefficient and the suction-side convexity YS. Accordingly, in the present invention, YS is determined such that a predetermined design lift coefficient is satisfied, thereby providing a wind turbine blade having the desired aerodynamic characteristics.

A method for designing a wind turbine blade according to a fourteenth aspect of the present invention is a method for designing a wind turbine blade including a blade body whose chord length increases from a blade tip toward a blade root. The method includes a design-lift-coefficient determining step of determining a predetermined design lift coefficient at each blade section of the blade body; and a YP-determining step of determining a pressure-side convexity YP such that the design lift coefficient determined in the design-lift-coefficient determining step is satisfied. The pressure-side convexity YP is the percentage obtained by dividing a distance from a chord on a pressure side, at a maximum-thickness position, by the chord length.

After conducting extensive research, the inventors have found that there is a strong correlation between the design lift coefficient and the pressure-side convexity YP. Accordingly, in the present invention, YP is determined such that a predetermined design lift coefficient is satisfied, thereby providing a wind turbine blade having the desired aerodynamic characteristics.

A method for designing a wind turbine blade according to a fifteenth aspect of the present invention is a method for designing a wind turbine blade including a blade body whose chord length decreases from a blade root toward a blade tip in a radial direction. The method includes specifying an airfoil profile (blade section profile) of the blade body at each radial position such that the airfoil profile has a suction-side profile that is extended or contracted in a Y direction.

Because the airfoil profile (blade section profile) at each radial position has a suction-side profile that is extended or contracted in the Y direction, a wind turbine blade that delivers the desired aerodynamic performance at each radial position can be provided.

A method for designing a wind turbine blade according to a sixteenth aspect of the present invention is a method for designing a wind turbine blade including a blade body whose chord length decreases from a blade root toward a blade tip in a radial direction. The method includes specifying an airfoil profile (blade section profile) of the blade body at each radial position such that the airfoil profile has a chordwise thickness distribution that is extended or contracted in a Y direction.

Because the airfoil profile (blade section profile) at each radial position has a thickness distribution that is extended or contracted in the Y direction, a wind turbine blade that delivers the desired aerodynamic performance at each radial position can be provided.

Preferably, the extension/contraction ratio is the ratio of the thickness ratio, which is the maximum thickness divided by the chord length.

A method for designing a wind turbine blade according to a seventeenth aspect of the present invention is a method for designing a wind turbine blade including a blade body whose chord length decreases from a blade root toward a blade tip in a radial direction. The method includes specifying an airfoil profile (blade section profile) of the blade body at each radial position such that the airfoil profile has a suction-side profile that is extended or contracted in a Y direction and a chordwise thickness distribution that is extended or contracted in the Y direction.

Because the airfoil profile (blade section profile) at each radial position has a suction-side profile and a thickness distribution that are extended or contracted in the Y direction, a wind turbine blade that delivers the desired aerodynamic performance at each radial position can be provided.

Preferably, the extension/contraction ratio of the thickness distribution is the ratio of the thickness ratio, which is the maximum thickness divided by the chord length.

A method for designing a wind turbine blade according to an eighteenth aspect of the present invention is a method for designing a wind turbine blade including a blade body whose chord length decreases from a blade root toward a blade tip in a radial direction. The method includes specifying an airfoil profile (blade section profile) of the blade body at each radial position such that the airfoil profile has a suction-side profile that is extended or contracted in a Y direction, and specifying a leading edge portion, extending from a leading edge to a maximum-thickness position, of the airfoil profile (blade section profile) of the blade body at each radial position such that the leading edge portion has a chordwise thickness distribution that is extended or contracted in the Y direction and a pressure-side profile determined from the thickness distribution and the suction-side profile.

Because the airfoil profile (blade section profile) at each radial position has a suction-side profile that is extended or contracted in the Y direction, a wind turbine blade that delivers the desired aerodynamic performance at each radial position can be provided.

In addition, because the leading edge portion of the airfoil profile (blade section profile) at each radial position has a pressure-side profile determined from the thickness distribution extended or contracted in the Y direction, a wind turbine blade that delivers the desired aerodynamic performance can be provided. The pressure surface coordinate representing the pressure-side profile (the distance between the chord position and the pressure-side profile) can be obtained by subtracting, from the suction surface coordinate of the suction-side profile (the distance between the chord position and the suction-side profile), the thickness obtained from the thickness distribution at the corresponding chord position (suction surface coordinate−thickness).

In addition, a trailing edge portion extending from the maximum-thickness position toward the trailing edge may be designed with any pressure-side profile to optimize the design lift coefficient.

In the method for designing the wind turbine blade according to the eighteenth aspect of the present invention, a trailing edge portion extending from the maximum-thickness position to a trailing edge may be specified such that the trailing edge portion has a pressure-side profile defined by adding a predetermined amount of adjustment to a reference pressure-side profile determined from the suction-side profile and the thickness distribution.

Because the trailing edge portion extending from the maximum-thickness position toward the trailing edge can be designed with any pressure-side profile by adding a predetermined amount of adjustment, the design lift coefficient can be optimized.

The amount of adjustment may be determined by a quartic function of chord position, wherein the amount of adjustment is 0 at the maximum-thickness position and the trailing edge, and wherein a first differential of a pressure surface coordinate that gives the pressure-side profile in the chordwise direction is 0.

The amount of adjustment can be determined in a simple manner, and therefore, the desired pressure-side profile can be easily determined.

A method for designing a wind turbine blade according to a nineteenth aspect of the present invention is a method for designing a wind turbine blade including providing a maximum-thickness position having a maximum thickness in a range of chordwise positions X/C of 0.28 to 0.32, the chordwise position X/C being a distance X, from a leading edge along a chord line, divided by a chord length C, and providing a maximum-camber position having a maximum camber in a range of chordwise positions X/C of 0.45 to 0.55.

After conducting research on blade sections of wind turbine blades through various numerical calculations and wind tunnel tests, the inventors have found that the following combination provides high performance (i.e., the optimum range of design lift coefficients) and low aerodynamic noise (i.e., a smaller boundary layer thickness at the trailing edge).

A maximum-thickness position located farther forward (closer to the leading edge), i.e., in a range of chordwise positions X/C of 0.28 to 0.32 (more preferably, 0.29 to 0.31), tends to result in a higher design lift coefficient, a higher maximum lift-to-drag ratio, and a smaller boundary layer thickness at the trailing edge than a maximum-thickness position located farther backward.

In addition, a forward camber, in which the maximum-camber position is located closer to the leading edge than the center of the blade chord, tends to result in a higher maximum lift-to-drag ratio and a smaller boundary layer thickness at the trailing edge than a backward camber, although the maximum lift coefficient tends to be lower. A backward camber, on the other hand, tends to result in a higher maximum lift coefficient, although the maximum lift-to-drag ratio tends to be lower. Thus, because there is a trade-off between forward and backward cambers, the maximum-camber position is set in a range of chordwise positions X/C of 0.45 to 0.55 so that the camber is midway between forward and backward cambers.

The above combination provides a wind turbine blade having high performance and low noise.

Preferably, the design tip speed ratio (blade tip speed divided by inflow wind speed) is 6 or more (more preferably, 8.0 to 9.0), and the Reynolds number is 3,000,000 to 10,000,000.

Advantageous Effects of Invention

Because the desired design lift coefficient is assigned to each of the blade tip region, the transition region, and the maximum-chord-length position to specify a suitable combination of design lift coefficients over the entire blade body, the wind turbine blade can deliver the desired aerodynamic characteristics under conditions where the upper limit of the chord length near the blade root is limited.

Because Y125, which correlates with the design lift coefficient, is specified, a blade profile having the desired design lift coefficients can be determined. Thus, a slender blade with high design lift coefficients can be provided, and therefore, the load on the wind turbine blade can be reduced. This allows the design of a longer wind turbine blade, which results in a higher level of electricity generation.

Because the suction-side convexity YS or the pressure-side convexity YP, which correlates with the design lift coefficient, is specified, a blade profile having the desired design lift coefficients can be determined. Thus, a slender blade with high design lift coefficients can be provided, and therefore, the load on the wind turbine blade can be reduced. This allows the design of a longer wind turbine blade, which results in a higher level of electricity generation.

Because the airfoil profile (blade section profile) at each radial position (at each thickness ratio) has a suction-side profile or thickness distribution that is extended or contracted in the Y direction, a wind turbine blade that delivers the desired aerodynamic performance to produce a higher output power can be provided.

By setting a suitable maximum-thickness position and a suitable maximum-camber position, a wind turbine blade having high performance and low noise can be provided.

DESCRIPTION OF EMBODIMENTS

Embodiments of the present invention will be described below with reference to the drawings.

First Embodiment

A wind turbine blade according to this embodiment is suitable for use as a blade of a wind power generation system. The wind power generation system includes, for example, three wind turbine blades, each joined to a rotor at a spacing of about 120°. Preferably, the wind turbine blades are slender blades with a rotation diameter (blade diameter) of 60 m or more and a solidity of 0.2 to 0.6. The wind turbine blades may be either variable-pitch or fixed-pitch.

Figure 1:
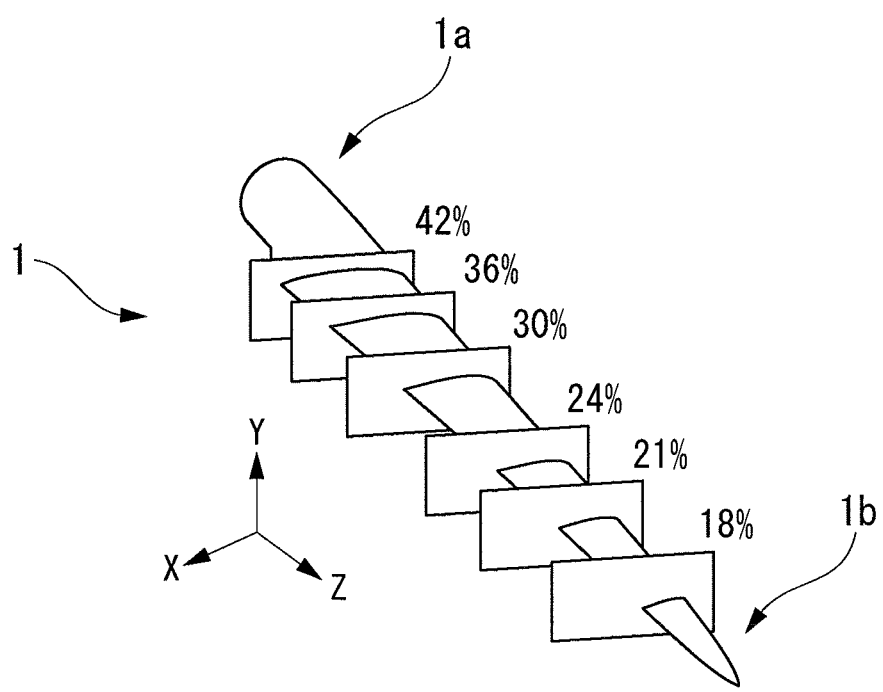
FIG. 1 is a perspective view including a typical shape of a wind turbine blade.

As shown in FIG. 1, a wind turbine blade 1 is a three-dimensional blade extending from a blade root 1a, which faces the center of rotation, toward a blade tip 1b.

As shown in the figure, a blade profile is expressed using a blade element section taken in a cross-section at constant Z (the longitudinal-axis direction of the blade) at each radial position (the position corresponding to the distance from the center of rotation of the blade) indicated by a thickness ratio (the percentage obtained by dividing the maximum thickness by the chord length). FIG. 1 shows that the profile of the wind turbine blade is defined using a blade element section taken at each of the radial positions having thickness ratios of 18%, 21%, 24%, 30%, 36%, and 42%. The radial position of the wind turbine blade 1 is not necessarily indicated by the thickness ratio; instead, it may be indicated by the radial position r corresponding to the distance from the center of rotation of the blade (or the radial position divided by the blade radius, i.e., the dimensionless radial position r/R).

Figure 2:
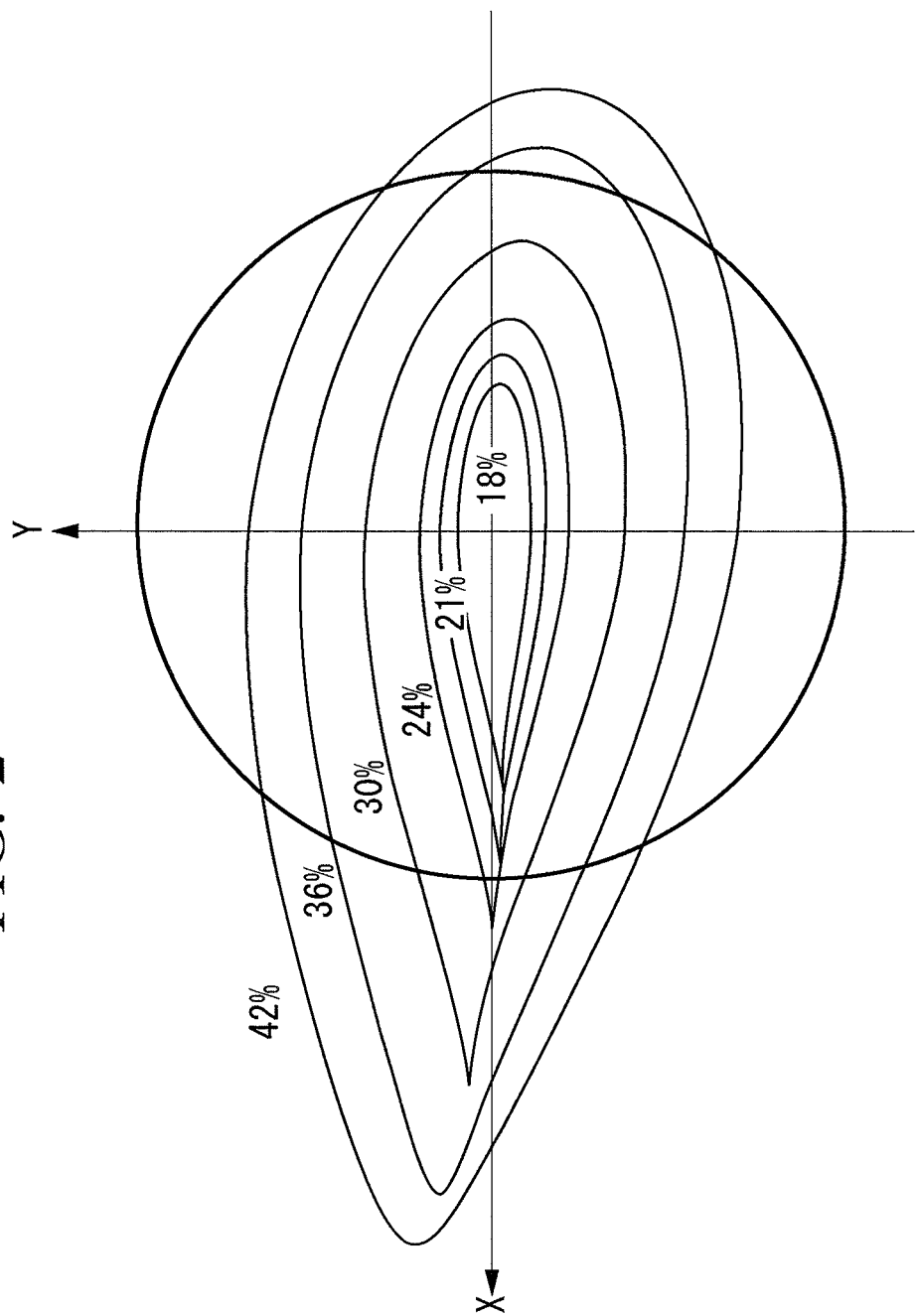
FIG. 2 is a diagram showing a cross-section at each thickness ratio in FIG. 1.

FIG. 2 is a projection of the blade element sections in FIG. 1 in the X-Y plane (the plane perpendicular to the Z axis). As shown in the figure, as viewed from the tip of the wind turbine blade 1 in the longitudinal direction, the leading edge is to the right, and the trailing edge is to the left.

Figure 3:
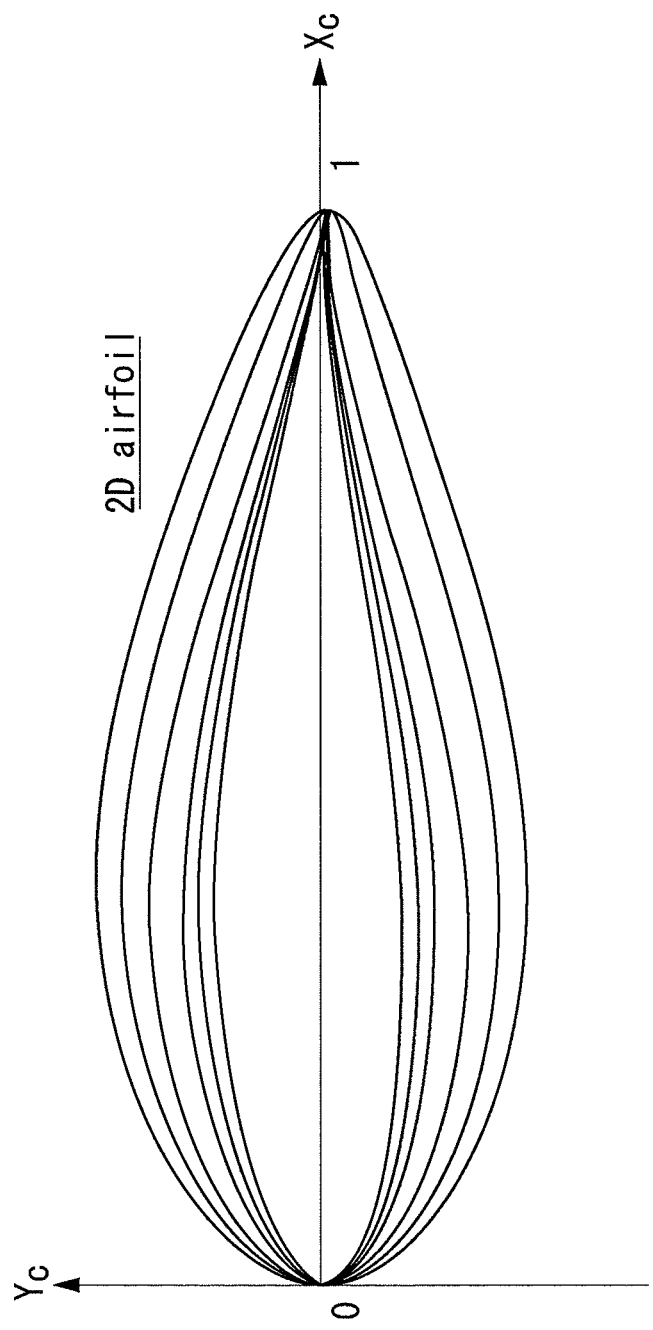
FIG. 3 is a diagram showing an airfoil at each thickness ratio in FIG. 1.

FIG. 3 shows the blade element section of the wind turbine blade 1 at each thickness ratio, normalized by defining the leading edge as X=0, Y=0 and the trailing edge as X=1, Y=0. The profiles expressed as in the figure are referred to as airfoils.

Figure 4:
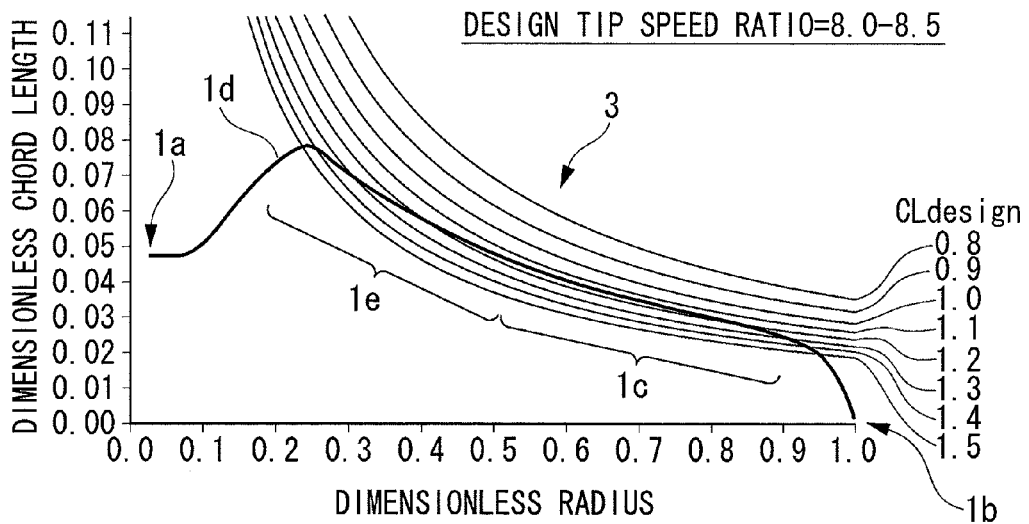
FIG. 4 is a graph illustrating the design of a wind turbine blade according to an embodiment of the present invention.

FIG. 4 shows a graph illustrating the design of the wind turbine blade 1 according to this embodiment.

In the figure, the horizontal axis indicates the dimensionless radius, and the vertical axis indicates the dimensionless chord length. The dimensionless radius, as described above, is the radial position r of the blade section from the center of rotation divided by the blade radius R of the wind turbine blade 1 (r/R). Here, the blade radius is half the diameter (blade diameter) of a locus circle traced by the blade tip when the wind turbine blade 1 rotates. The dimensionless chord length is the chord length c of the blade section divided by the blade radius R (c/R).

FIG. 4 shows a plurality of curves (thin lines) with constant design lift coefficient CLdesign obtained by equation (3) above. A curve with constant design lift coefficient satisfies equation (3) above and therefore gives the optimum chord length (vertical axis) at the particular design tip speed ratio in terms of aerodynamic characteristics.

In FIG. 4, the design tip speed ratio is 8.0 to 8.5, and the Reynolds number is 3,000,000 to 10,000,000.

As indicated by the thick line in the figure, the wind turbine blade 1 according to this embodiment includes a blade body 3 whose chord length increases from the blade tip 1b toward the blade root 1a. In this embodiment, the dimensionless radius of the blade body 3 is 0.2 to 0.95.

The blade body 3 includes a blade tip region 1c located near the blade tip 1b and whose chord length increases gradually, a maximum-chord-length position 1d located near the blade root 1a and having the maximum chord length, and a transition region 1e located between the blade tip region 1c and the maximum-chord-length position 1d.

In this embodiment, the dimensionless radius of the blade tip region 1c is 0.5 to 0.95, the dimensionless radius of the maximum-chord-length position 1d is (0.25±0.05), and the dimensionless radius of the transition region 1e is from 0.2 (excluding 0.2) to less than 0.5.

As shown in FIG. 4, the blade tip region 1c has a substantially constant first design lift coefficient (in this embodiment, 1.15). The first design lift coefficient of the blade tip region 1c is set to a practical upper limit feasible in terms of the thickness ratio (e.g., about 18%) of the blade tip region 1c, which is a thin portion. For a thin portion, a higher design lift coefficient, which is preferred in terms of aerodynamic characteristics, can be achieved by increasing the curvature, although an increased curvature can result in flow separation and therefore higher loss as an exclusive event; therefore, the design lift coefficient is limited to a certain value. Thus, because the blade tip region 1c has a substantially constant first design lift coefficient, the blade tip region 1c, which receives a larger wind force and therefore produces a higher output power, delivers the desired aerodynamic characteristics.

The maximum-chord-length position 1d has a second design lift coefficient (in this embodiment, 1.45) higher than the first design lift coefficient. The second design lift coefficient is determined from the maximum chord length, which is limited for reasons such as transportation. For example, as shown in FIG. 4, if the dimensionless maximum chord length is limited to 0.08 by factors such as the width of the roads where the wind turbine blade 1 is transported, the design lift coefficient for that dimensionless maximum chord length is determined to be 1.45 from the dimensionless radius (0.25±0.05) of the maximum-chord-length position 1d.

The transition region 1e has a design lift coefficient increasing gradually from the first design lift coefficient (1.15) to the second design lift coefficient (1.45). That is, the blade root side of the blade tip region 1c, which has the first design lift coefficient, is smoothly connected to the maximum-chord-length position 1d, which has the second design lift coefficient. This allows for a reduced range of variation in design lift coefficient if the chord length is increased from the blade tip region 1c to the maximum-chord-length position 1d, thus avoiding a substantial loss of aerodynamic performance. In particular, the desired aerodynamic characteristics can also be maintained at the thick portion (the portion thicker than the blade tip region 1c, which is the region extending from the transition region 1e to the maximum-chord-length position 1d), which has not been taken into account in the related art.

Figure 5:
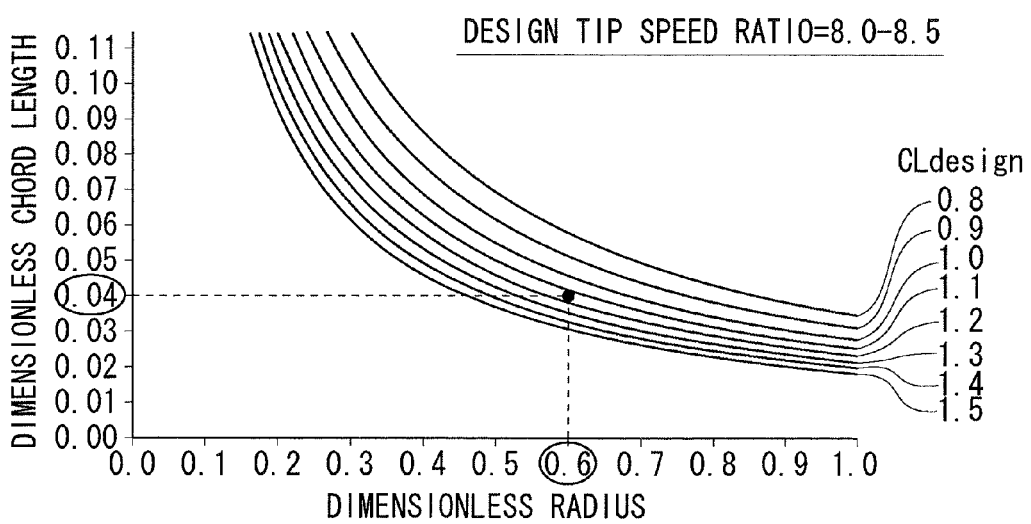
FIG. 5 is a graph illustrating a method for designing the wind turbine blade in FIG. 4.
Figure 6:
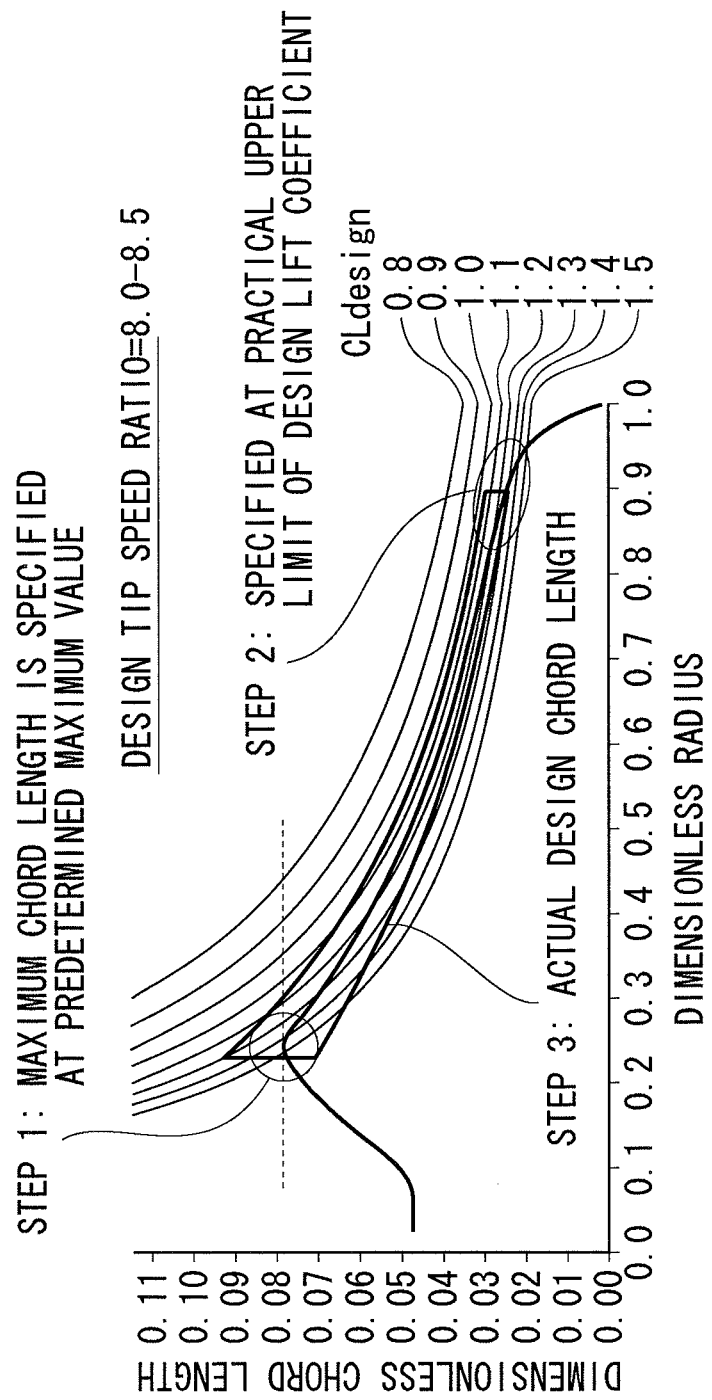
FIG. 6 is a graph illustrating a method for designing the wind turbine blade in FIG. 4.

Next, a method for designing the wind turbine blade 1 described above will be described with reference to FIGS. 5 and 6. FIGS. 5 and 6 are graphs used for designing the wind turbine blade 1 shown in FIG. 4; therefore, they have the same vertical and horizontal axes and show the same design lift coefficient CLdesign curves as FIG. 4.

Step 0

At a certain design tip speed ratio (in this embodiment, 8.0 to 8.5) and a certain dimensionless radius, the dimensionless chord length satisfying the desired design lift coefficient, which is the optimum dimensionless chord length in terms of performance, is determined by equation (3). For example, as shown in FIG. 5, the dimensionless chord length that gives a desired design lift coefficient of 1.15 at a dimensionless radial position of 0.6 is 0.04.

Step 1

The chord length at the maximum-chord-length position (at a dimensionless radial position of about 0.2 to 0.3; in this embodiment, 0.24) $1d$ is specified at a predetermined maximum value (a dimensionless chord length of about 0.065 to 0.085; in this embodiment, 0.08) for reasons such as transportation. Accordingly, the design lift coefficient at the maximum-chord-length position $1d$ (second design lift coefficient) is determined (in this embodiment, 1.45).

Step 2

The chord length near the blade tip (at a dimensionless radial position of about 0.85 to 0.95) is specified at the practical upper limit of the design lift coefficient (in this embodiment, about 1.15 for a thin portion having a thickness ratio of about 18%; first design lift coefficient).

Step 3

The design chord length is specified using a smooth line joining the points determined in steps 1 and 2. More specifically, the dimensionless chord length of the blade tip region $1c$, where the dimensionless radial position is 0.5 to 0.95, is specified along the curve at a CLdesign of 1.15 so that the design lift coefficient determined in step 2 is maintained. The dimensionless chord length of the transition region $1e$, where the dimensionless radial position is 0.2 to 0.5, is specified so that the design lift coefficient increases gradually from the first design lift coefficient (1.15) to the second design lift coefficient (1.45) in the direction from the blade tip toward the blade root. Thus, combinations of dimensionless radial positions and design lift coefficients of the blade body 3 of the wind turbine blade 1 are specified.

The solid line shown in FIG. 6 indicates the median dimensionless chord length; in practice, the dimensionless chord length is specified within a predetermined range at each dimensionless radius, and the range is specified within the frame 5 in FIG. 6.

Figure 7A:
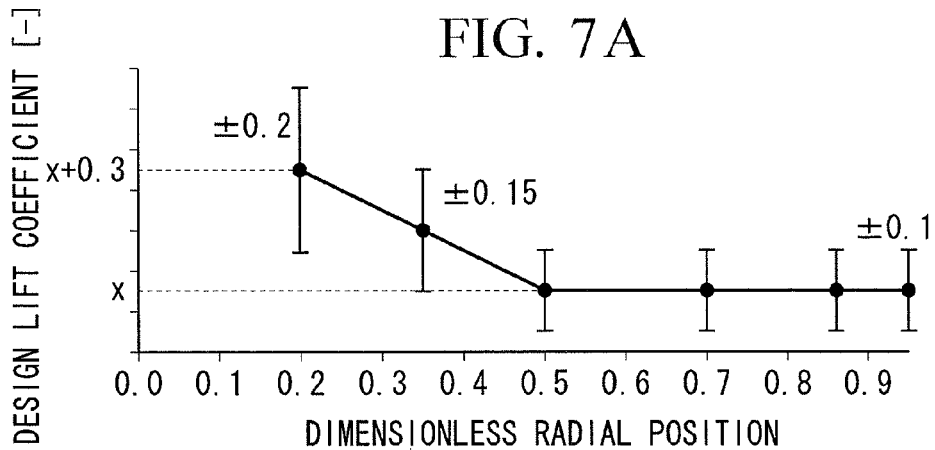
FIG. 7A is a graph showing a distribution of design lift coefficient against dimensionless radius.
Figure 7B:
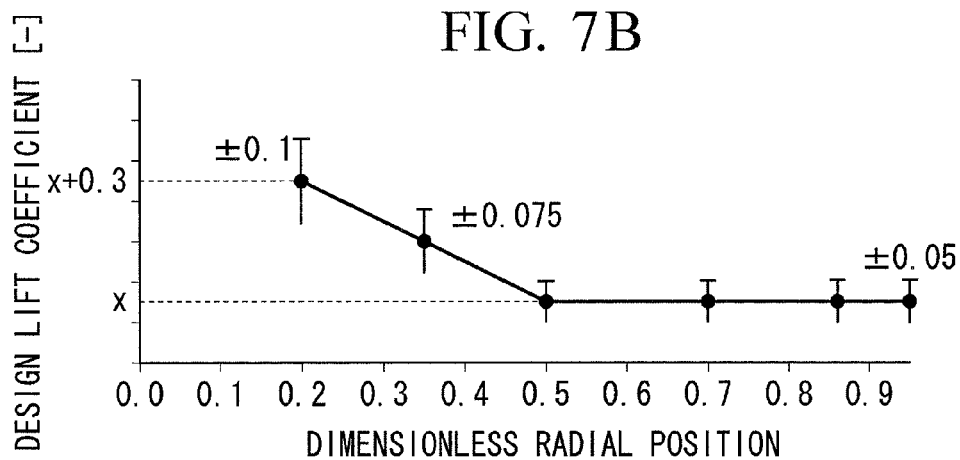
FIG. 7B is a graph showing a distribution of design lift coefficient against dimensionless radius.
Figure 7C:
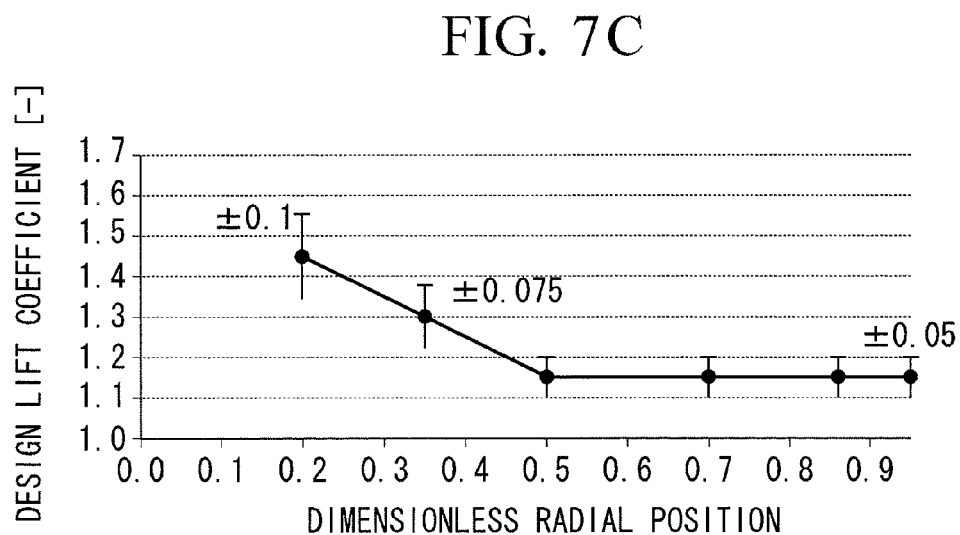
FIG. 7C is a graph showing a distribution of design lift coefficient against dimensionless radius.

FIGS. 7A, 7B, and 7C show distributions of the design lift coefficient against the dimensionless radial position for the wind turbine blade 1 having the profile defined as above.

In FIG. 7A, the first design lift coefficient of the blade tip region $1c$, where the dimensionless radial position is 0.5 to 0.95, is X±0.10, where X is the median.

The second design lift coefficient of the maximum-chord-length position $1d$, where the dimensionless radial position is (0.25±0.05), is X+0.3±0.2.

The design lift coefficient of the transition region $1e$, where the dimensionless radial position is from 0.2 (excluding 0.2) to less than 0.5, at the central position (in the figure, at a dimensionless radius of 0.35) between the end of the blade tip region $1c$ facing the blade root (at a dimensionless radius of 0.5) and the maximum-chord-length position $1d$ is X+0.15±0.15.

FIG. 7B shows an example where the range of design lift coefficients is narrower than in FIG. 7A. Specifically, the first design lift coefficient of the blade tip region $1c$, where the dimensionless radial position is 0.5 to 0.95, is X±0.05, where X is the median.

The second design lift coefficient of the maximum-chord-length position $1d$, where the dimensionless radial position is (0.25±0.05), is X+0.3±0.1.

The design lift coefficient of the transition region $1e$, where the dimensionless radial position is from 0.2 (excluding 0.2) to less than 0.5, at the central position (in the figure, at a dimensionless radius of 0.35) between the end of the blade tip region $1c$ facing the blade root (at a dimensionless radius of 0.5) and the maximum-chord-length position $1d$ is X+0.15±0.075.

FIG. 7C shows an example where specific design lift coefficients are applied. Specifically, the first design lift coefficient of the blade tip region $1c$, where the dimensionless radial position is 0.5 to 0.95, is 1.15±0.05.

The second design lift coefficient of the maximum-chord-length position $1d$, where the dimensionless radial position is (0.25±0.05), is 1.45±0.1.

The design lift coefficient of the transition region $1e$, where the dimensionless radial position is from 0.2 (excluding 0.2) to less than 0.5, at the central position (in the figure, at a dimensionless radius of 0.35) between the end of the blade tip region $1c$ facing the blade root (at a dimensionless radius of 0.5) and the maximum-chord-length position $1d$ is 1.30±0.075.

Figure 8A:
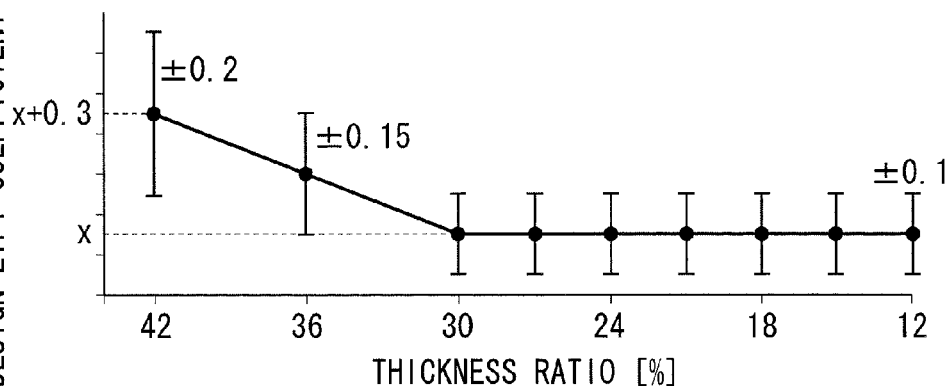
FIG. 8A is a graph showing a distribution of design lift coefficient against thickness ratio.
Figure 8B:
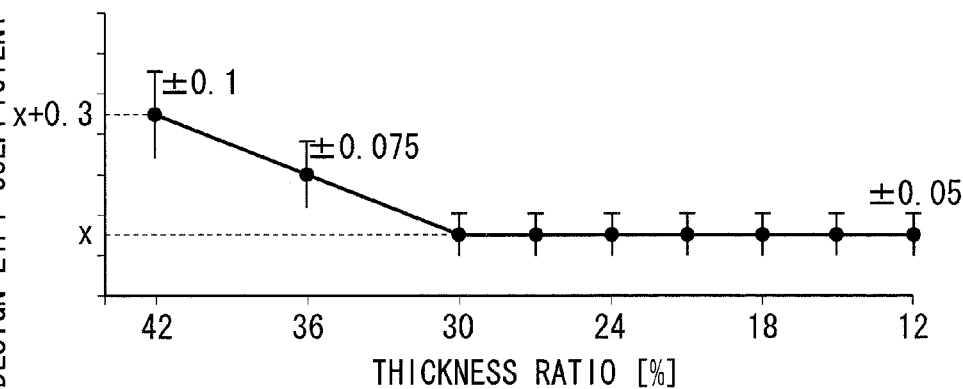
FIG. 8B is a graph showing a distribution of design lift coefficient against thickness ratio.
Figure 8C:
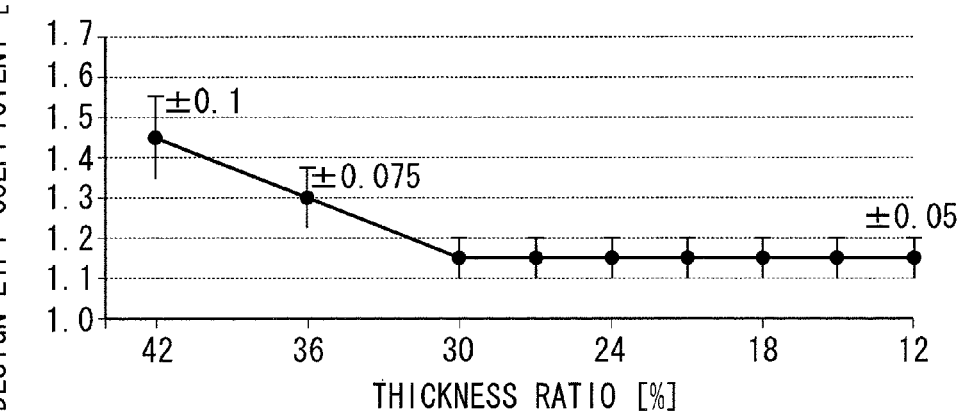
FIG. 8C is a graph showing a distribution of design lift coefficient against thickness ratio.

FIGS. 8A, 8B, and 8C show distributions of the design lift coefficient against the thickness ratio for the wind turbine blade 1 having the profile defined as in FIGS. 4 to 6. Specifically, whereas the horizontal axes in FIGS. 7A, 7B, and 7C indicate the dimensionless radius, the horizontal axes in FIGS. 8A, 8B, and 8C indicate the thickness ratio. The thickness ratio is the percentage obtained by dividing the maximum thickness by the chord length.

In FIG. 8A, the first design lift coefficient of the blade tip region $1c$, where the thickness ratio is 12% to 30%, is X±0.10, where X is the median.

The second design lift coefficient of the maximum-chord-length position $1d$, where the thickness ratio is 42%, is X+0.3±0.2.

The design lift coefficient of the transition region $1e$, where the dimensionless radial position is from 30% (excluding 30%) to less than 42%, at the central position (in the figure, at a thickness ratio of 36%) between the end of the blade tip region $1c$ facing the blade root (at a thickness ratio of 30%) and the maximum-chord-length position $1d$ is X+0.15±0.15.

FIG. 8B shows an example where the range of design lift coefficients is narrower than in FIG. 8A. Specifically, the first design lift coefficient of the blade tip region $1c$, where the thickness ratio is 12% to 30%, is X±0.05, where X is the median.

The second design lift coefficient of the maximum-chord-length position $1d$, where the thickness ratio is 42%, is X+0.3±0.1.

The design lift coefficient of the transition region $1e$, where the thickness ratio is from 30% (excluding 30%) to less than 42%, at the central position (in the figure, at a thickness ratio of 36%) between the end of the blade tip region $1c$ facing the blade root (at a thickness ratio of 30%) and the maximum-chord-length position $1d$ is X+0.15±0.075.

FIG. 8C shows an example where specific design lift coefficients are applied. Specifically, the first design lift coefficient of the blade tip region $1c$, where the thickness ratio is 12% to 30%, is 1.15±0.05.

The second design lift coefficient of the maximum-chord-length position $1d$, where the thickness ratio is 42%, is 1.45±0.1.

The design lift coefficient of the transition region $1e$, where the thickness ratio is from 30% (excluding 30%) to less than 42%, at the central position (in the figure, at a thickness ratio of 36%) between the end of the blade tip region $1c$ facing the blade root (at a thickness ratio of 30%) and the maximum-chord-length position $1d$ is 1.30±0.075.

Next, a method for specifying the profile of the wind turbine blade 1 having the desired design lift coefficient at each thickness position (or radial position) after the desired design lift coefficient is determined as above (design-lift-coefficient determining step) will be described.

Figure 9:
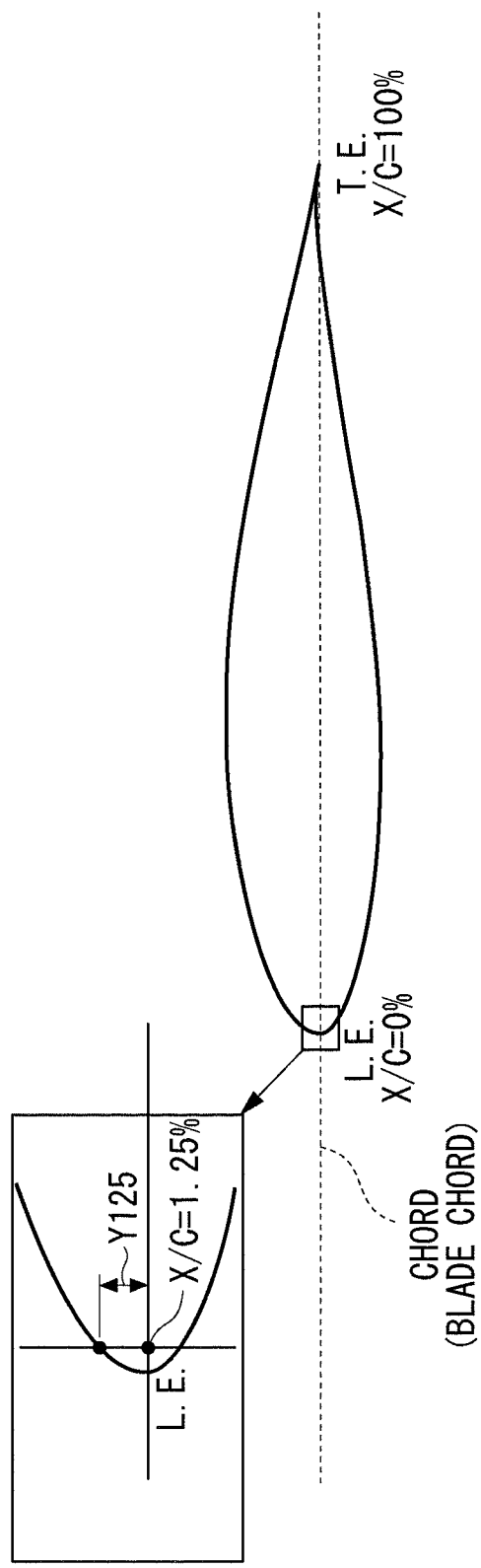
FIG. 9 is a diagram illustrating Y125.

Specifically, Y125, which indicates the distance between the suction side and the chord (blade chord) at the leading edge, is determined (Y125-determining step) to define the airfoil shape at each thickness position. Y125, as shown in FIG. 9, is the percentage obtained by dividing the distance from the chord on the suction side, at a 1.25% position, by the chord length, where the position of the leading edge along the chord length is defined as 0% and the position of the trailing edge along the chord length is defined as 100%.

Figure 10A:
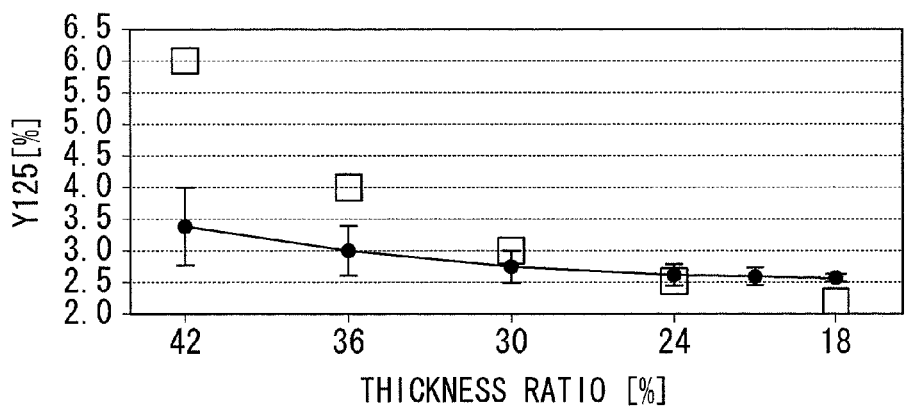
FIG. 10A is a graph showing a distribution of Y125 against thickness ratio.
Figure 10B:
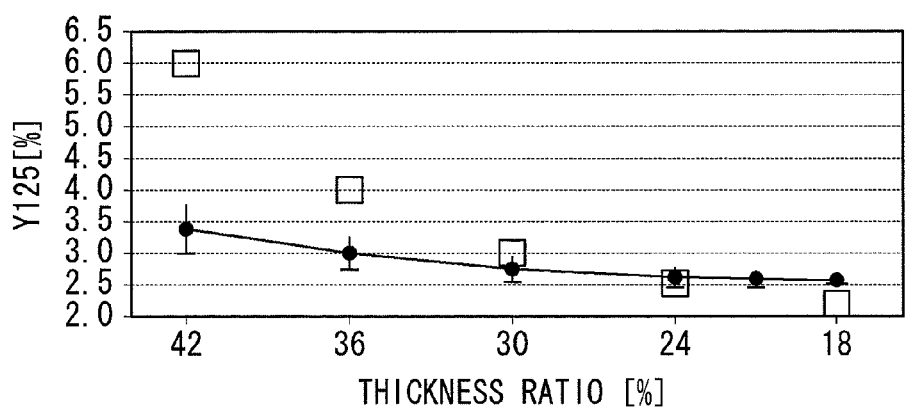
FIG. 10B is a graph showing a distribution of Y125 against thickness ratio.
Figure 10C:
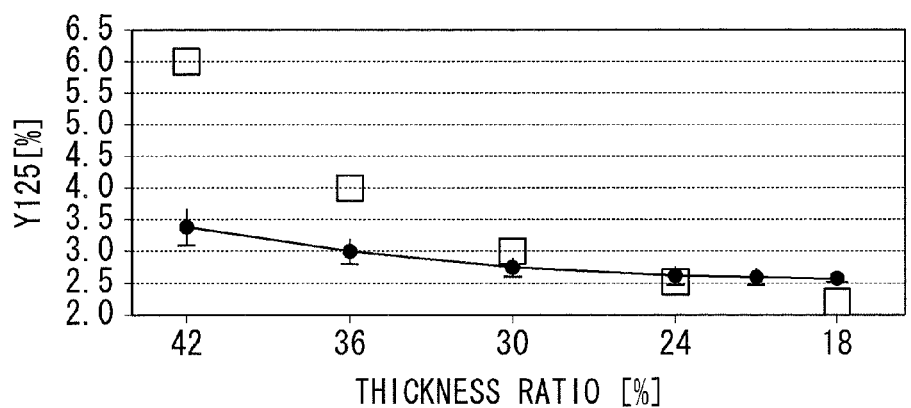
FIG. 10C is a graph showing a distribution of Y125 against thickness ratio.
Figure 11A:
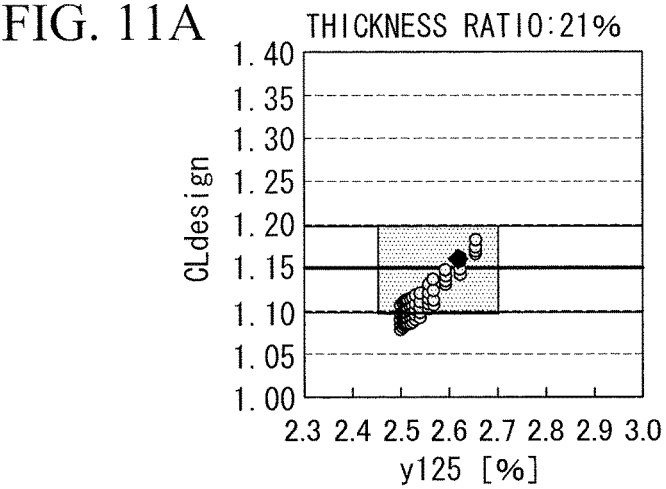
FIG. 11A is a graph showing a correlation between design lift coefficient and Y125.
Figure 11B:
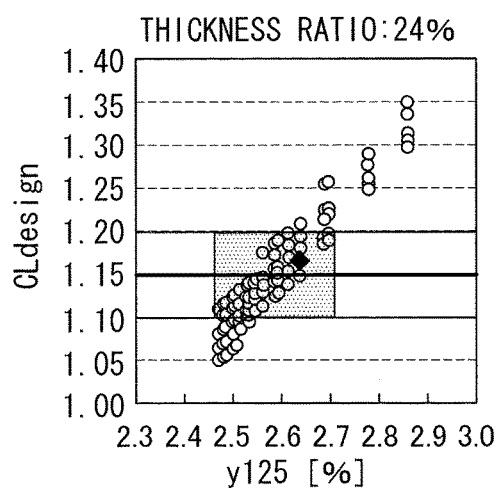
FIG. 11B is a graph showing a correlation between design lift coefficient and Y125.
Figure 11C:
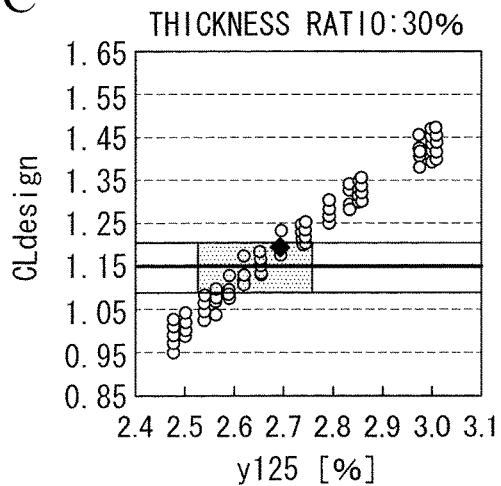
FIG. 11C is a graph showing a correlation between design lift coefficient and Y125.
Figure 11D:
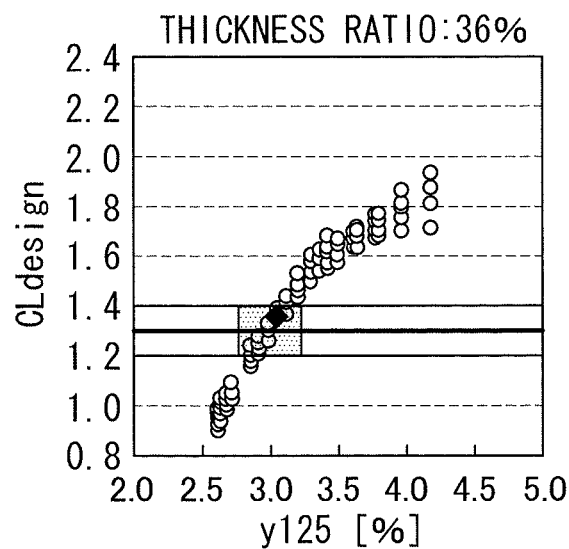
FIG. 11D is a graph showing a correlation between design lift coefficient and Y125.
Figure 11E:
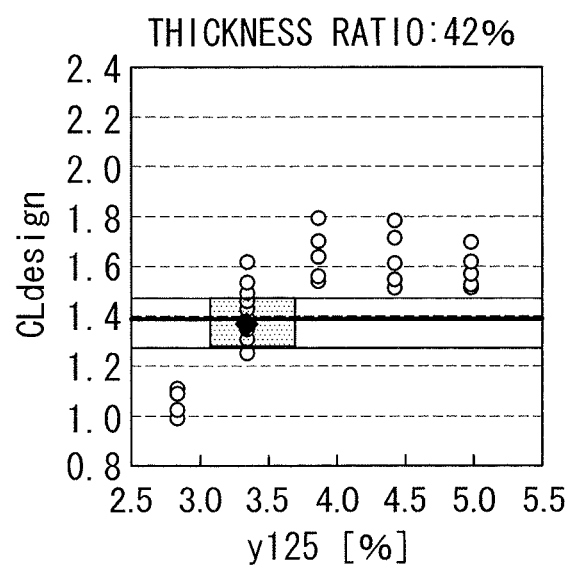
FIG. 11E is a graph showing a correlation between design lift coefficient and Y125.

FIGS. 10A, 10B, and 10C show distributions of Y125 against the thickness ratio.

Y125 in FIGS. 10A, 10B, and 10C is specified as in the following table.

TABLE 1

| | Thickness ratio | | | | | |
|---|---|---|---|---|---|---|
| | 42% | 36% | 30% | 24% | 21% | 18% |
| (a) | 3.4 ± 0.6 | 3.0 ± 0.40 | 27.5 ± 0.25 | 2.6 ± 0.15 | 2.575 ± 0.13 | 2.55 ± 0.1 |
| (b) | 3.4 ± 0.4 | 3.0 ± 0.25 | 27.5 ± 0.20 | 2.6 ± 0.15 | 2.575 ± 0.13 | 2.55 ± 0.1 |
| (c) | 3.4 ± 0.2 | 3.0 ± 0.20 | 27.5 ± 0.15 | 2.6 ± 0.15 | 2.575 ± 0.13 | 2.55 ± 0.1 |

That is, Y125 is specified within the ranges in (a), preferably within the ranges in (b), and more preferably within the ranges in (c).

As shown in FIGS. 10A, 10B, and 10C, Y125 of the wind turbine blade 1 at each blade section is determined by an interpolation curve passing through Y125 at each thickness ratio in the above table.

FIGS. 10A, 10B, and 10C plot, as squares, the values of Y125 of a wind turbine blade based on an NACA blade in the related art as an example for comparison with this embodiment. Thus, the wind turbine blade according to this embodiment has different Y125 from the wind turbine blade in the related art.

Once Y125 at each thickness ratio is determined in this way, the wind turbine airfoil from the leading edge to the maximum-thickness position is substantially uniquely determined.

FIGS. 11A to 11E show data that provides evidence that Y125 gives the desired design lift coefficient.

FIGS. 11A to 11E show results for thickness ratios of 21%, 24%, 30%, 36%, and 42%, respectively. These figures are obtained by numerical simulations with varying Y125.

These figures demonstrate that there is a strong correlation between the design lift coefficient and Y125.

Discussed next is a blade section having a higher maximum lift coefficient, a higher maximum lift-to-drag ratio, and a smaller turbulent boundary layer thickness at the trailing edge, as well as the optimum design lift coefficient determined as above.

Figure 12:
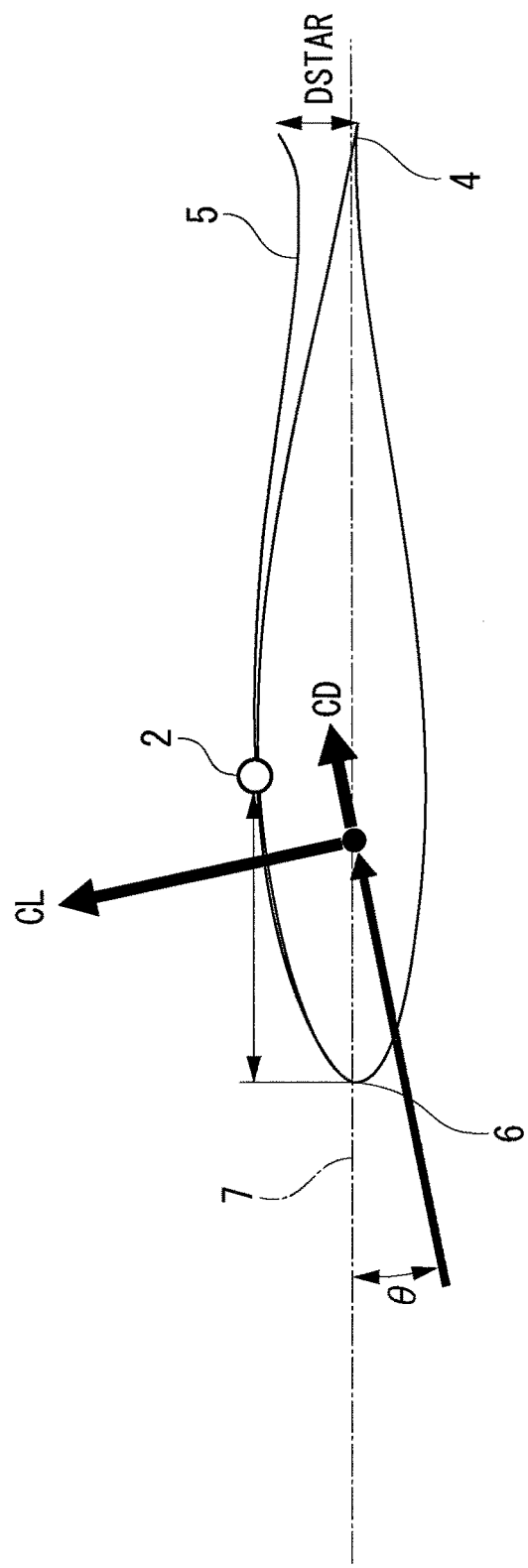
FIG. 12 is a diagram showing a blade section according to an embodiment of the present invention.

FIG. 12 shows an airfoil according to this embodiment. The airfoil shape is normalized with respect to a chord length C, i.e., the length from a leading edge 6 to a trailing edge 4 on a chord line 7, in a blade element section at each thickness ratio of the wind turbine blade 1. Specifically, the airfoil shape is normalized by defining the leading edge as X/C=0, Y/C=0 and the trailing edge as X/C=1, Y/C=0.

In the figure, θ indicates the wind inflow angle, CD indicates the drag coefficient, and CL indicates the lift coefficient.

As shown in the figure, a turbulent boundary layer 5 forms on the suction side from a maximum-thickness position 2 to the trailing edge 4. The turbulent boundary layer 5 releases boundary layer vortices, which cause aerodynamic noise. Accordingly, the aerodynamic noise can be reduced by reducing the turbulent boundary layer thickness DSTAR at the trailing edge 4.

In this embodiment, the airfoil shown in the figure is provided in a range of thickness ratios of 12% to 21%. This thickness ratio range is defined as the range that functions as the main portion for converting wind force to the rotation of the wind turbine blade.

The maximum-thickness position 2 is provided in a range of chordwise positions X/C of 0.28 to 0.32 (more preferably, 0.29 to 0.31).

The maximum-camber position, which has the maximum camber, is provided in a range of chordwise positions X/C of 0.45 to 0.55.

The camber distribution is substantially symmetrical with respect to the maximum-camber position in the chordwise direction.

FIGS. 13A to 13D show parameters characterizing the performance of the wind turbine blade with respect to the wind inflow angle θ.

Figure 13A:
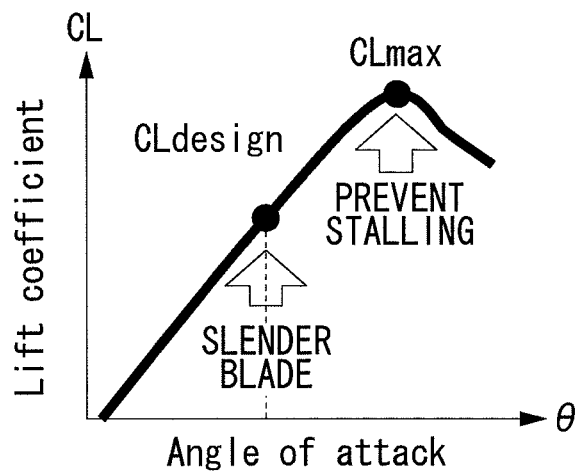
FIG. 13A is a graph illustrating a parameter related to the performance of a wind turbine blade.

FIG. 13A shows changes in lift coefficient CL against the wind inflow angle θ. As shown in the figure, the lift coefficient CL increases with increasing wind inflow angle θ and decreases after reaching the maximum, i.e., the maximum lift coefficient CLmax. The maximum lift coefficient CLmax is related to improvements in performance at high wind speeds and prevention of stalling, which results from, for example, fluctuations and disturbances in the incoming wind, and a higher maximum lift coefficient CLmax is desirable. The maximum lift coefficient CLmax is also a parameter that affects the blade aerodynamic performance during the transition state after the wind turbine reaches the maximum rotational speed and before it reaches the rated output power. As shown in the figure, a higher design lift coefficient CLdesign is desirable for slender blades, such as those of large wind turbines, to deliver high performance.

Figure 13B:
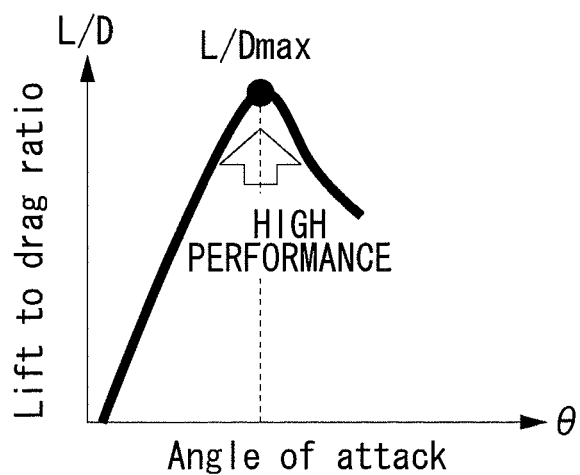
FIG. 13B is a graph illustrating a parameter related to the performance of a wind turbine blade.

FIG. 13B shows changes in lift-to-drag ratio against the wind inflow angle θ. As shown in the figure, the lift-to-drag ratio L/D increases with increasing wind inflow angle θ and decreases after reaching the maximum lift-to-drag ratio L/Dmax. The maximum lift-to-drag ratio L/Dmax is a parameter that affects the blade aerodynamic performance during variable-speed operation of the wind turbine (design point), and a higher lift-to-drag ratio L/D is desirable.

Figure 13C:
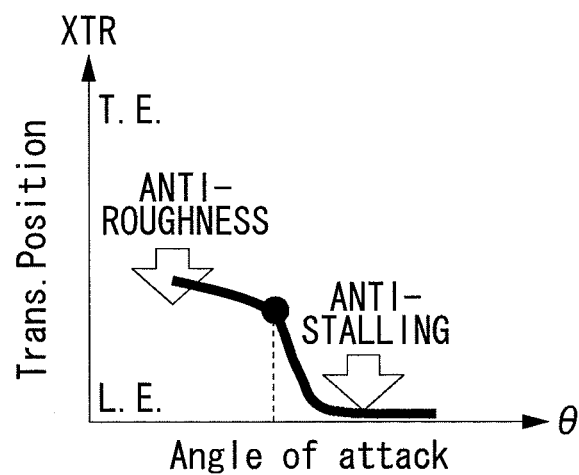
FIG. 13C is a graph illustrating a parameter related to the performance of a wind turbine blade.

FIG. 13C shows changes in transition position XTR against the wind inflow angle θ. As shown in the figure, the transition position XTR is located substantially in the center of the blade chord at small wind inflow angles θ and shifts toward the leading edge (L.E.) above a certain wind inflow angle θ. This means that the roughness characteristics and the stall characteristics are improved by shifting the transition position XTR forward (toward the leading edge).

Figure 13D:
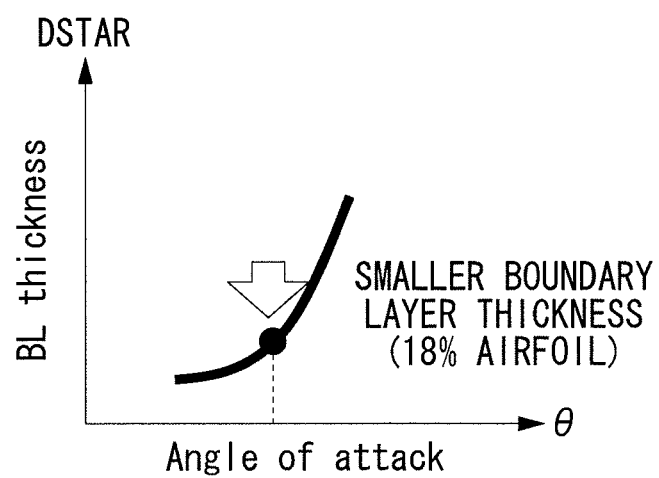
FIG. 13D is a graph illustrating a parameter related to the performance of a wind turbine blade.

FIG. 13D shows changes in the boundary layer thickness (displacement thickness) DSTAR at the trailing edge against the wind inflow angle θ. The boundary layer thickness DSTAR increases with increasing wind inflow angle θ. A smaller wind inflow angle θ is desirable because it is the main factor in aerodynamic noise.

After conducting research on blade sections of wind turbine blades through various numerical calculations and wind tunnel tests, the inventors have found the tendencies shown in the following table, where "high camber" means a relatively large amount of camber.

TABLE 2

|  | Maximum-thickness position | Maximum-camber position | Amount of camber |
|---|---|---|---|
| CLdesign | Excellent (higher as position is located farther forward) | — | Good (higher with high camber) |
| Clmax | — | Excellent (higher with backward camber) | Good (higher with high camber) |
| L/Dmax | Excellent (higher as position is located farther forward) | Excellent (higher with forward camber) | Excellent (higher with high camber) |
| DSTAR | Excellent (smaller as position is located farther forward) | Excellent (smaller with forward camber) | — |

As shown in the above table, a maximum-thickness position located farther forward (closer to the leading edge than the central position of the blade chord) tends to result in a higher design lift coefficient CLdesign, a higher maximum lift-to-drag ratio L/Dmax, and a smaller boundary layer thickness DSTAR than a maximum-thickness position located farther backward. Thus, the maximum-thickness position is preferably provided in a range of chordwise positions X/C of 0.28 to 0.32 (more preferably, 0.29 to 0.31).

For the maximum-camber position, a forward camber (closer to the leading edge than the central position of the blade chord) tends to result in a higher maximum lift-to-drag ratio L/Dmax and a smaller boundary layer thickness DSTAR than a backward camber, although the maximum lift coefficient CLmax tends to be lower. A backward camber, on the other hand, tends to result in a higher maximum lift coefficient CLmax, although the maximum lift-to-drag ratio L/Dmax tends to be lower. Thus, because there is a trade-off between forward and backward cambers, the maximum-camber position is preferably provided in a range of chordwise positions X/C of 0.45 to 0.55 so that the camber is midway between forward and backward cambers. In addition, the camber distribution is preferably substantially symmetrical with respect to the maximum-camber position in the chordwise direction.

For the amount of camber, a high camber tends to result in a higher design lift coefficient CLdesign, a higher maximum lift coefficient CLmax, and a higher maximum lift-to-drag ratio L/Dmax.

Figure 14A:
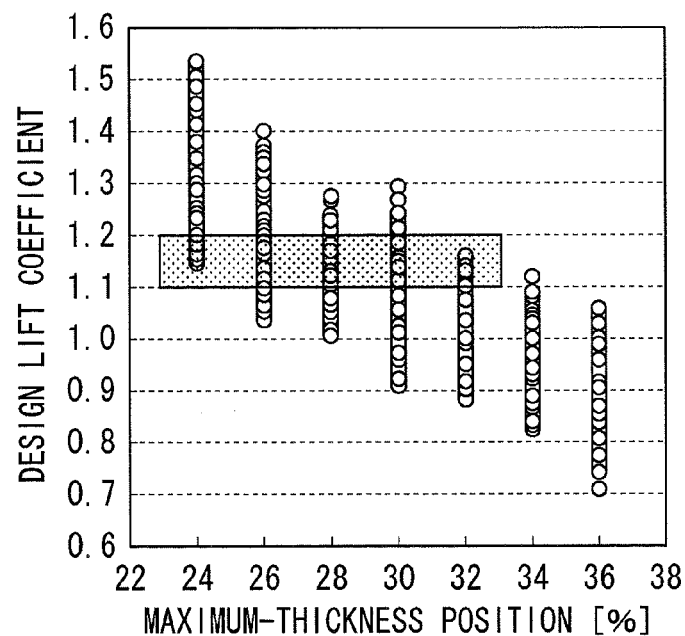
FIG. 14A is a graph showing variations in design lift coefficient and boundary layer thickness with maximum-thickness position.
Figure 14B:
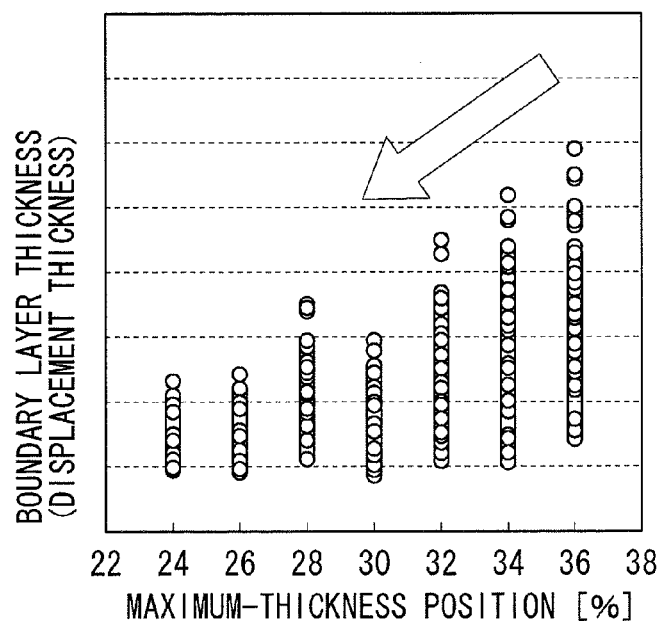
FIG. 14B is a graph showing variations in design lift coefficient and boundary layer thickness with maximum-thickness position.

FIGS. 14A and 14B show the basis for why the chordwise position X/C of the maximum-thickness position is 0.28 to 0.32 (more preferably, 0.29 to 0.31). These figures plot results obtained by numerical simulations under a plurality of conditions. As shown in FIG. 4, the chordwise position X/C at least needs to be 32% (0.32) or less to ensure a high range of design lift coefficients CLdesign, i.e., 1.15±0.05. In addition, the chordwise position X/C is preferably located as far forward as possible because the boundary layer thickness DSTAR tends to be smaller (the noise is lower) as the maximum-thickness position is located farther forward. A maximum-thickness position located excessively forward, however, might result in an excessively high design lift coefficient deviating from the optimum range, degraded stall characteristics, and a decreased trailing edge buckling strength against an edge moment; therefore, the lower limit of the chordwise position X/C is preferably 0.28.

Figure 15A:
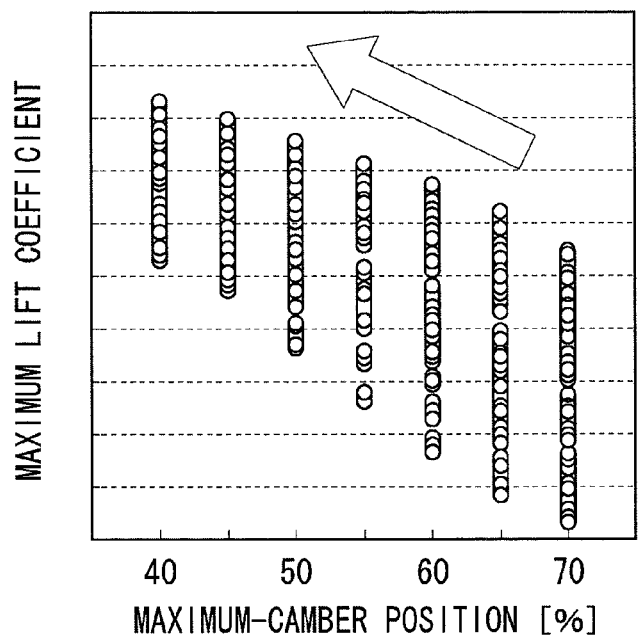
FIG. 15A is a graph showing variations in maximum lift coefficient and maximum lift-to-drag ratio with maximum-camber position.
Figure 15B:
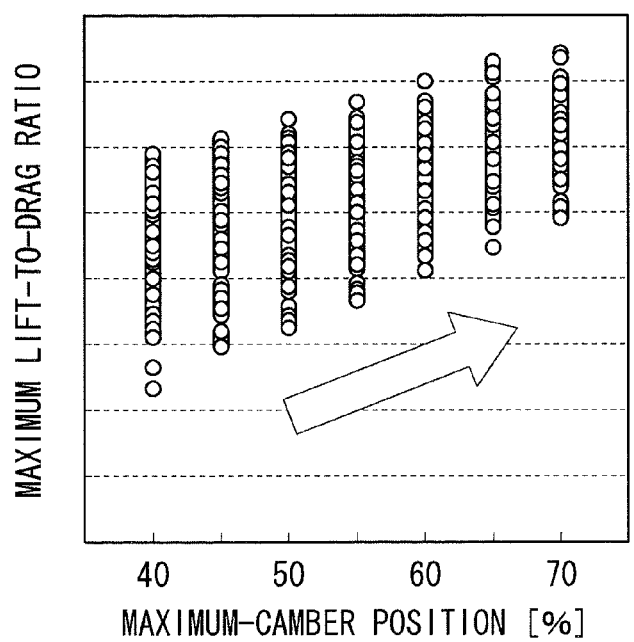
FIG. 15B is a graph showing variations in maximum lift coefficient and maximum lift-to-drag ratio with maximum-camber position.

FIGS. 15A and 15B show the basis for why the chordwise position X/C of the maximum-camber position is preferably 0.45 to 0.55 and why the camber distribution is preferably substantially symmetrical with respect to the maximum-camber position in the chordwise direction. These figures, like FIGS. 14A and 14B, plot results obtained by numerical simulations under a plurality of conditions. FIG. 15A shows that the maximum lift coefficient CLmax increases as the maximum-camber position is shifted away from the trailing edge toward the leading edge. That is, a forward camber is preferred in terms of maximum lift coefficient CLmax. FIG. 15B shows that the maximum lift-to-drag ratio L/Dmax increases as the maximum-camber position is shifted away from the leading edge toward the trailing edge. That is, a backward camber is preferred in terms of maximum lift-to-drag ratio L/Dmax. To ensure both a high maximum lift coefficient CLmax and a high maximum lift-to-drag ratio L/Dmax, therefore, the chordwise position X/C of the maximum-camber position is preferably midway, i.e., 0.45 to 0.55 (preferably, 0.5).

As discussed above, this embodiment provides the following advantageous effects.

Because the desired design lift coefficient is assigned to each of the blade tip region 1c, the transition region 1e, and the maximum-chord-length position 1d to specify a suitable combination of design lift coefficients over the entire blade body 3, the wind turbine blade 1 can deliver the desired aerodynamic characteristics under conditions where the upper limit of the chord length near the blade root is limited. In particular, the aerodynamic performance of the thick portion located closer to the blade root than to the blade tip region 1c (the transition region 1e and the maximum-chord-length position 1d) can be improved.

In addition, because Y125, which correlates with the design lift coefficient, is specified, a blade profile having the desired design lift coefficients can be determined. Thus, a slender blade with high design lift coefficients can be provided, and therefore, the load on the wind turbine blade can be reduced. This allows the design of a longer wind turbine blade, which results in a higher level of electricity generation.

In addition, because the maximum-thickness position is located farther forward, the maximum-camber position is located in the center in the chordwise direction, and the camber distribution is symmetrical with respect to the maximum-camber position in the chordwise direction, a wind turbine blade with high performance and low noise can be provided.

Second Embodiment

This embodiment differs from the first embodiment in that whereas the first embodiment determines Y125, which indicates the distance between the suction side and the chord (blade chord) at the leading edge, this embodiment determines the blade profile using the suction-side convexity YS of the blade. The other points are similar to those of the first embodiment; therefore, a description thereof is omitted.

A method for specifying the profile of the wind turbine blade 1 having the desired design lift coefficient at each thickness position (or radial position) after the desired design lift coefficient is determined as in FIG. 8C (design-lift-coefficient determining step) will be described.

Figure 16:
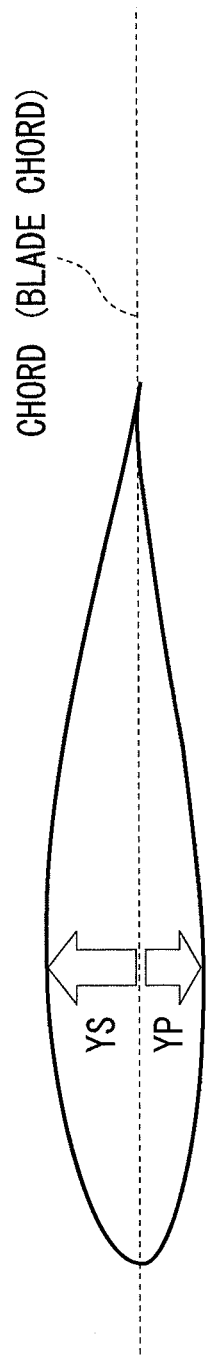
FIG. 16 is a sectional view of a blade illustrating suction-side convexity YS and pressure-side convexity YP.

Specifically, the suction-side convexity YS of the blade is determined (YS-determining step) to define the airfoil shape at each thickness position. YS, as shown in FIG. 16, is the percentage obtained by dividing the distance from the chord (blade chord) on the suction side, at the maximum-thickness position, by the chord length.

Figure 17A:
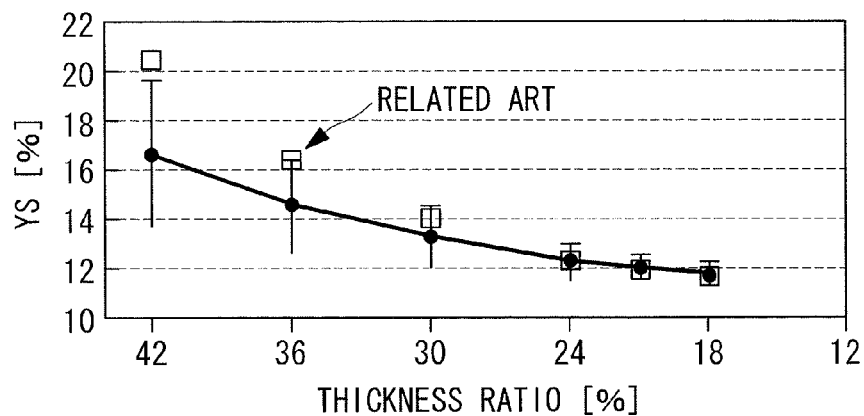
FIG. 17A is a graph showing a distribution of suction-side convexity YS against thickness ratio.
Figure 17B:
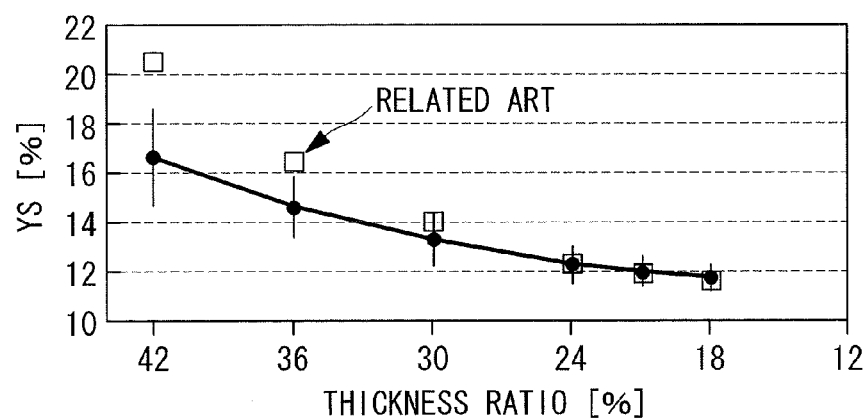
FIG. 17B is a graph showing a distribution of suction-side convexity YS against thickness ratio.
Figure 17C:
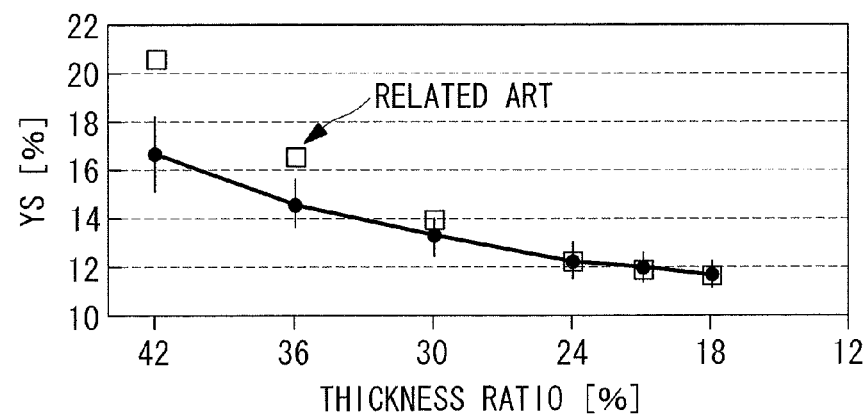
FIG. 17C is a graph showing a distribution of suction-side convexity YS against thickness ratio.
Figure 18A:
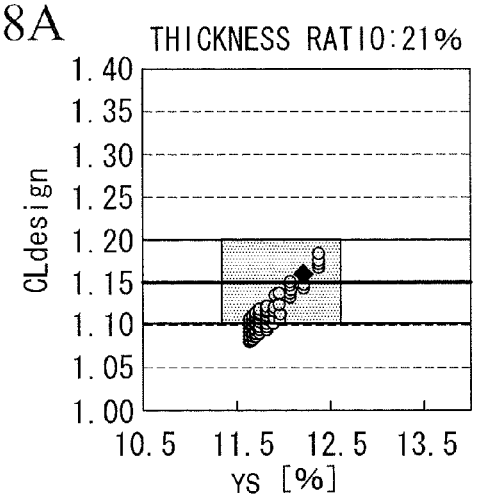
FIG. 18A is a graph showing a correlation between design lift coefficient and suction-side convexity YS.
Figure 18B:
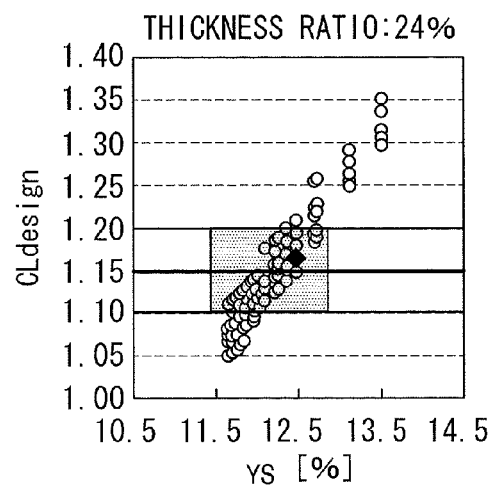
FIG. 18B is a graph showing a correlation between design lift coefficient and suction-side convexity YS.
Figure 18C:
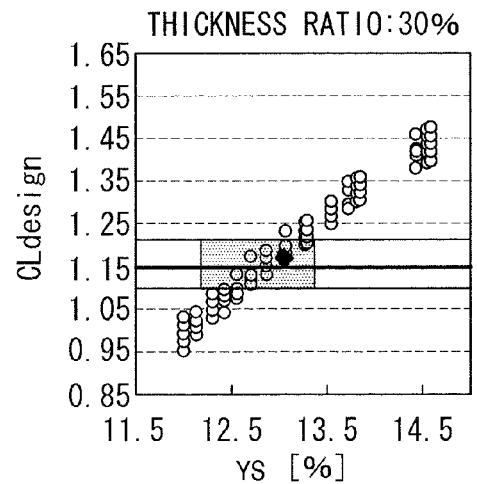
FIG. 18C is a graph showing a correlation between design lift coefficient and suction-side convexity YS.
Figure 18D:
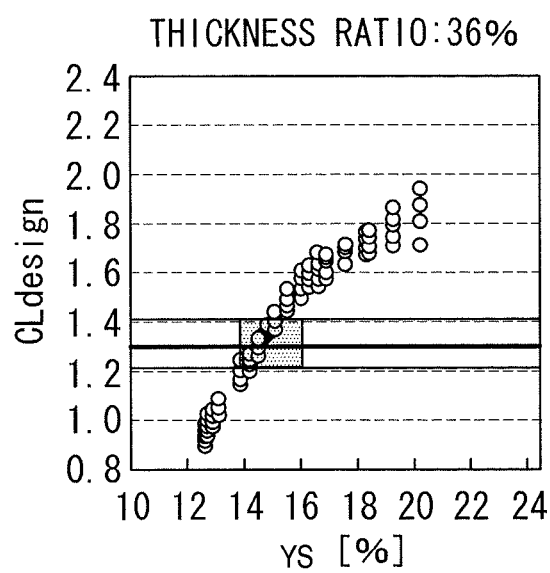
FIG. 18E is a graph showing a correlation between design lift coefficient and suction-side convexity YS.
Figure 18E:
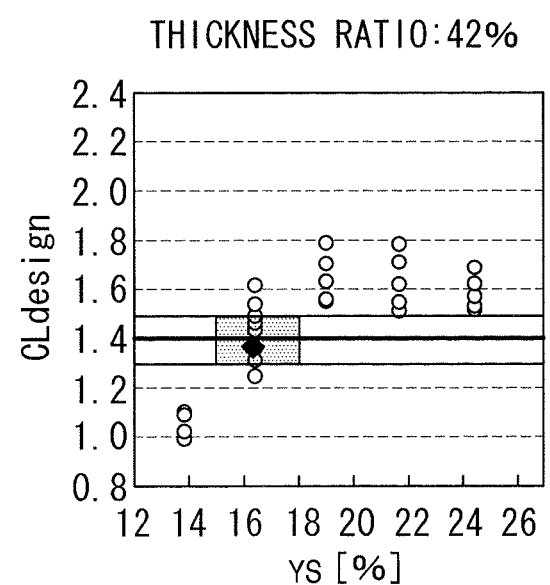

FIGS. 17A, 17B, and 17C show distributions of the suction-side convexity YS against the thickness ratio.

YS in FIGS. 17A, 17B, and 17C is specified as in the following table.

TABLE 3

| | Thickness ratio | | | | | |
|---|---|---|---|---|---|---|
| | 42% | 36% | 30% | 24% | 21% | 18% |
| (a) | 16.6 ± 3.0 | 14.6 ± 2.0 | 13.3 ± 1.2 | 12.3 ± 0.7 | 12.0 ± 0.6 | 11.7 ± 0.5 |
| (b) | 16.6 ± 2.0 | 14.6 ± 1.2 | 13.3 ± 1.0 | 12.3 ± 0.7 | 12.0 ± 0.6 | 11.7 ± 0.5 |
| (c) | 16.6 ± 1.5 | 14.6 ± 1.0 | 13.3 ± 0.8 | 12.3 ± 0.7 | 12.0 ± 0.6 | 11.7 ± 0.5 |

That is, the suction-side convexity YS is specified within the ranges in (a), preferably within the ranges in (b), and more preferably within the ranges in (c).

As shown in FIGS. 17A, 17B, and 17C, the suction-side convexity YS of the wind turbine blade 1 at each blade section is determined by an interpolation curve passing through the suction-side convexity YS at each thickness ratio in the above table.

FIGS. 17A, 17B, and 17C plot, as squares, the suction-side convexities YS of a wind turbine blade based on an NACA blade in the related art as an example for comparison with this embodiment. Thus, the wind turbine blade according to this embodiment has different suction-side convexities YS from the wind turbine blade in the related art.

FIGS. 18A to 18E show data that provides evidence that the suction-side convexity YS gives the desired design lift coefficient.

FIGS. 18A to 18E show results for thickness ratios of 21%, 24%, 30%, 36%, and 42%, respectively. These figures are obtained by numerical simulations with varying suction-side convexities YS.

These figures demonstrate that there is a strong correlation between the design lift coefficient and the suction-side convexity YS.

As discussed above, this embodiment provides the following advantageous effect.

Because the suction-side convexity YS, which correlates with the design lift coefficient, is specified, a blade profile having the desired design lift coefficients can be determined. Thus, a slender blade with high design lift coefficients can be provided, and therefore, the load on the wind turbine blade can be reduced. This allows the design of a longer wind turbine blade, which results in a higher level of electricity generation.

Third Embodiment

This embodiment differs from the second embodiment in that whereas the second embodiment determines the blade profile using the suction-side convexity YS, this embodiment determines the blade profile using the pressure-side convexity YP. The other points are similar to those of the first embodiment; therefore, a description thereof is omitted.

A method for specifying the profile of the wind turbine blade 1 having the desired design lift coefficient at each thickness position (or radial position) after the desired design lift coefficient is determined as in FIG. 8C (design-lift-coefficient determining step) will be described.

Specifically, the pressure-side convexity YP of the blade is determined (YP-determining step) to define the airfoil shape at each thickness position. YP, as shown in FIG. 16, is the percentage obtained by dividing the distance from the chord (blade chord) on the pressure side, at the maximum-thickness position, by the chord length.

Figure 19A:
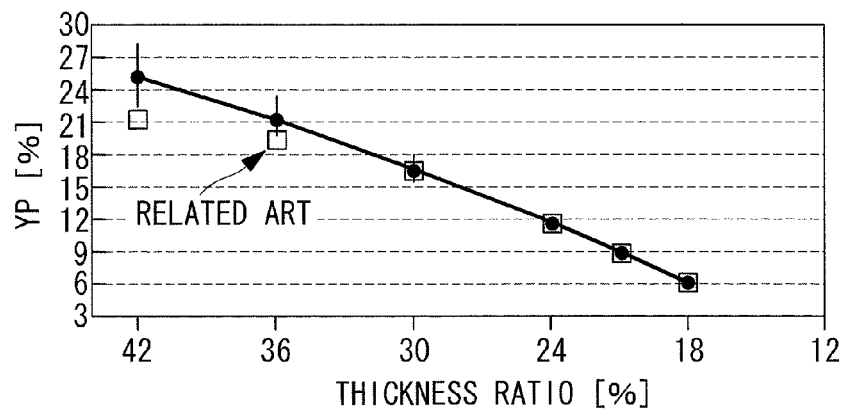
FIG. 19A is a graph showing a distribution of pressure-side convexity YP against thickness ratio.
Figure 19B:
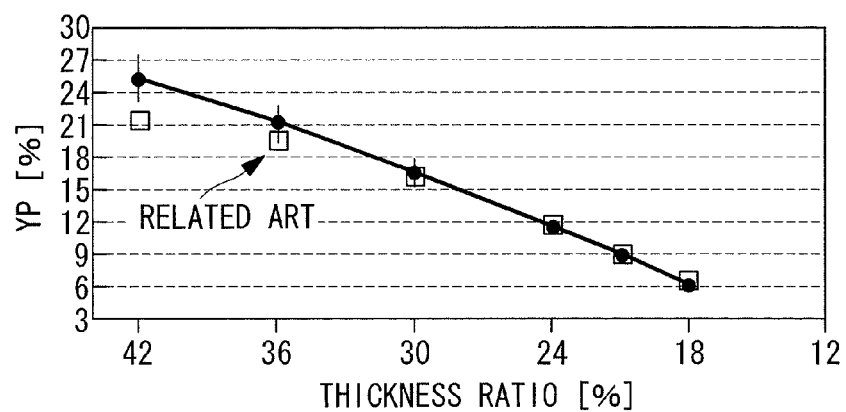
FIG. 19B is a graph showing a distribution of pressure-side convexity YP against thickness ratio.
Figure 19C:
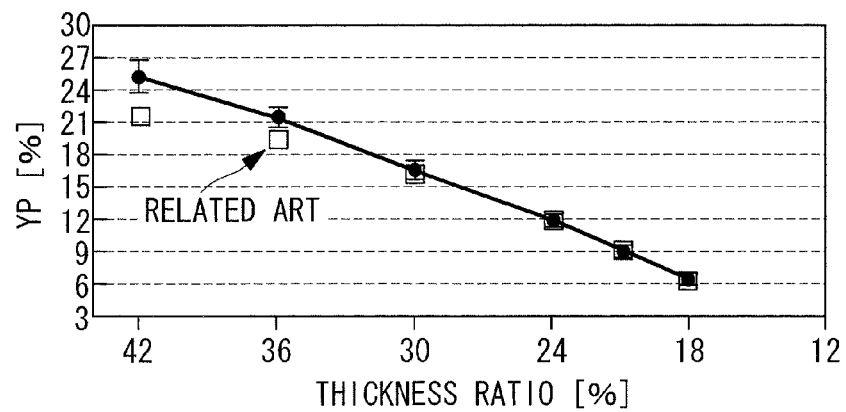
Figure 20A:
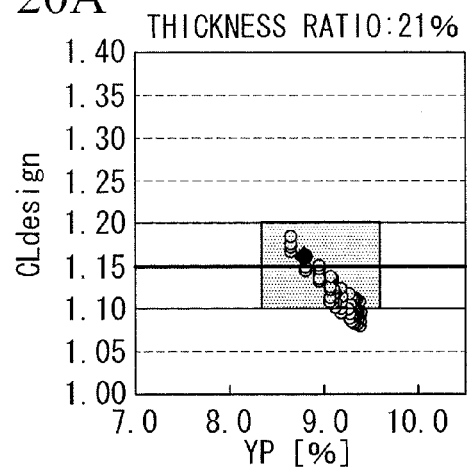
FIG. 20A is a graph showing a correlation between design lift coefficient and suction-side convexity YP.
Figure 20B:
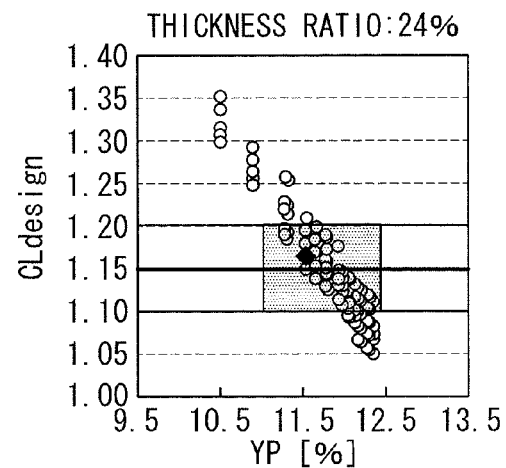
FIG. 20B is a graph showing a correlation between design lift coefficient and suction-side convexity YP.
Figure 20C:
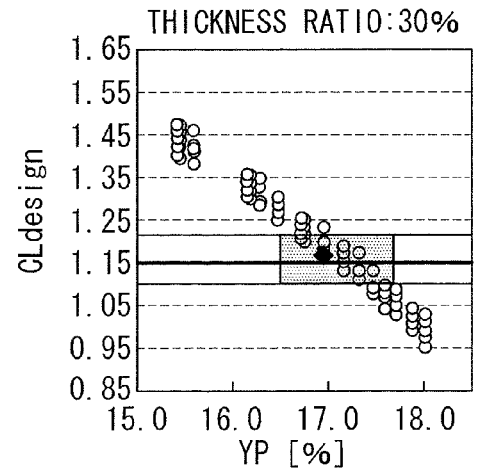
FIG. 20C is a graph showing a correlation between design lift coefficient and suction-side convexity YP.
Figure 20D:
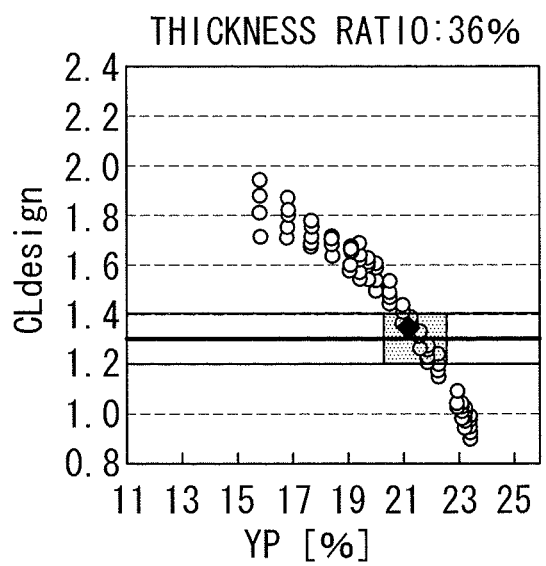
FIG. 20D is a graph showing a correlation between design lift coefficient and suction-side convexity YP.
Figure 20E:
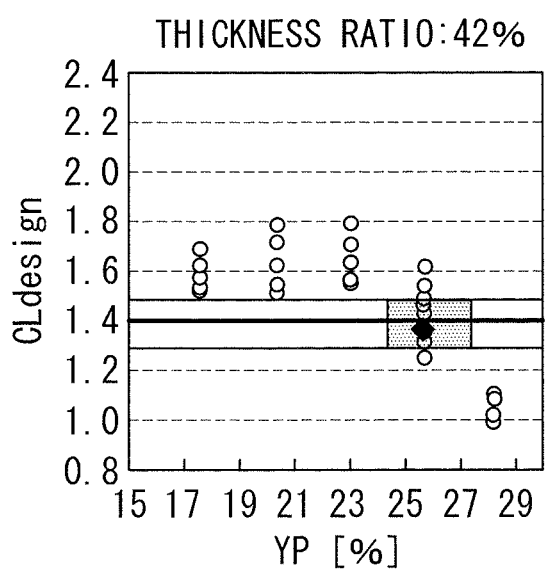
FIG. 20E is a graph showing a correlation between design lift coefficient and suction-side convexity YP.

FIGS. 19A, 19B, and 19C show distributions of the pressure-side convexity YP against the thickness ratio.

YP in FIGS. 19A, 19B, and 19C is specified as in the following table.

TABLE 4

| | Thickness ratio | | | | | |
|---|---|---|---|---|---|---|
| | 42% | 36% | 30% | 24% | 21% | 18% |
| (a) | 25.4 ± 3.0 | 21.4 ± 2.0 | 16.7 ± 1.2 | 11.7 ± 0.7 | 9.0 ± 0.6 | 6.3 ± 0.5 |
| (b) | 25.4 ± 2.0 | 21.4 ± 1.2 | 16.7 ± 1.0 | 11.7 ± 0.7 | 9.0 ± 0.6 | 6.3 ± 0.5 |
| (c) | 25.4 ± 1.5 | 21.4 ± 1.0 | 16.7 ± 0.8 | 11.7 ± 0.7 | 9.0 ± 0.6 | 6.3 ± 0.5 |

That is, the pressure-side convexity YP is specified within the ranges in (a), preferably within the ranges in (b), and more preferably within the ranges in (c).

As shown in FIGS. 19A, 19B, and 19C, the pressure-side convexity YP of the wind turbine blade 1 at each blade section is determined by an interpolation curve passing through the pressure-side convexity YP at each thickness ratio in the above table.

FIGS. 19A, 19B, and 19C plot, as squares, the pressure-side convexities YS of a wind turbine blade based on an NACA blade in the related art as an example for comparison with this embodiment. Thus, the wind turbine blade according to this embodiment has different pressure-side convexities YP from the wind turbine blade in the related art.

FIGS. 20A to 20E show data that provides evidence that the pressure-side convexity YP gives the desired design lift coefficient.

FIGS. 20A to 20E show results for thickness ratios of 21%, 24%, 30%, 36%, and 42%, respectively. These figures are obtained by numerical simulations with varying pressure-side convexities YP.

These figures demonstrate that there is a strong correlation between the design lift coefficient and the pressure-side convexity YP.

As discussed above, this embodiment provides the following advantageous effect.

Because the pressure-side convexities YP, which correlates with the design lift coefficient, is specified, a blade profile having the desired design lift coefficients can be determined. Thus, a slender blade with high design lift coefficients can be provided, and therefore, the load on the wind turbine blade can be reduced. This allows the design of a longer wind turbine blade, which results in a higher level of electricity generation.

FIGS. 21A to 21D show the effects provided by the first to third embodiments described above.

Figure 21A:
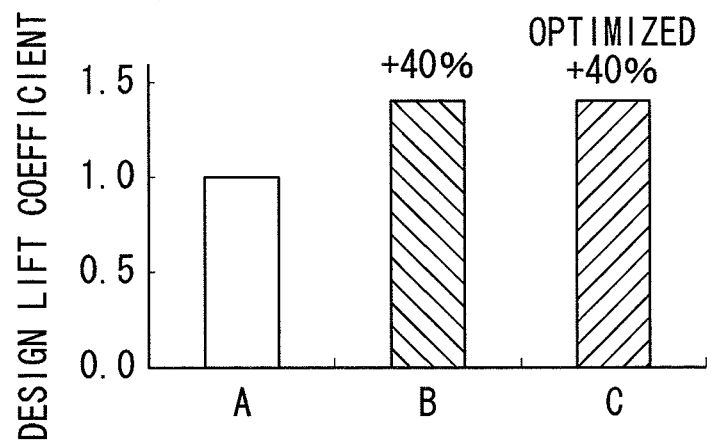
FIG. 21A is a graph showing an effect provided by optimizing the design lift coefficient as in the present invention.

As shown in FIG. 21A, blade A is a reference blade used for comparison, whose design lift coefficient is about 0.8 at the blade tip and is not optimized in the lengthwise (radial)

direction, blade B is a blade whose design lift coefficient is 40% higher than that of blade A, and blade C is a blade corresponding to the embodiments, whose design lift coefficient is the same as that of blade B and is optimized in the lengthwise (radial) direction.

Figure 21B:
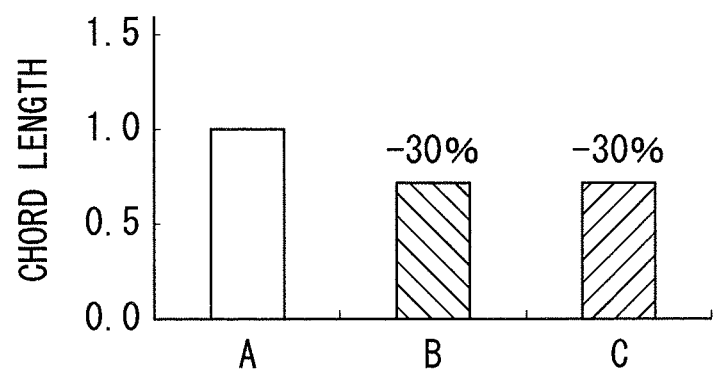
FIG. 21B is a graph showing an effect provided by optimizing the design lift coefficient as in the present invention.
Figure 21C:
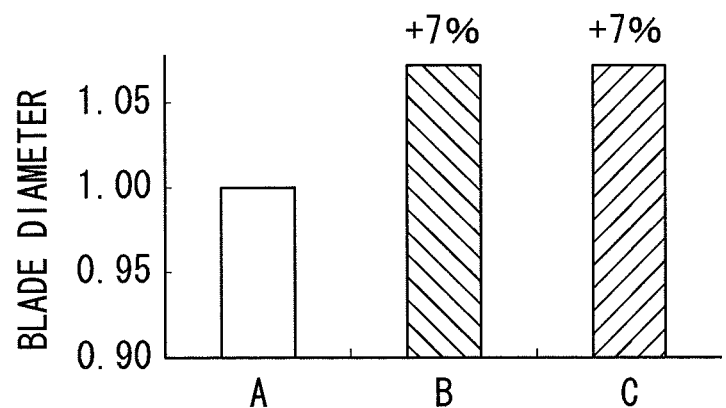
FIG. 21C is a graph showing an effect provided by optimizing the design lift coefficient as in the present invention.
Figure 21D:
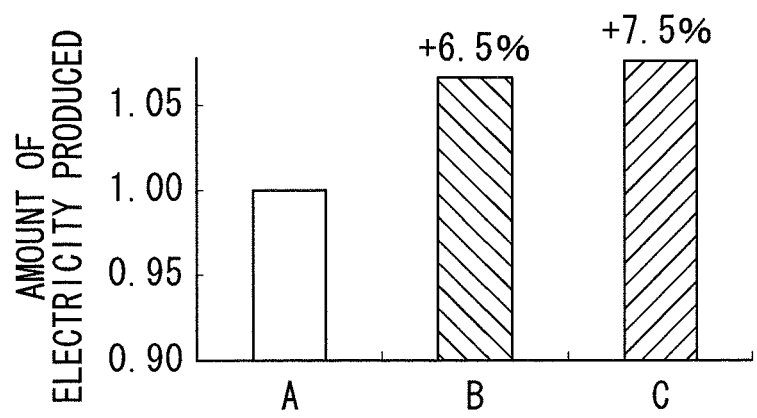
FIG. 21D is a graph showing an effect provided by optimizing the design lift coefficient as in the present invention.

A blade like the case of blade B, whose design lift coefficient is improved, has a 30% shorter optimum chord length, as shown in FIG. 21B, which allows the blade to have a 7% larger blade diameter (at a given rotational speed), as shown in FIG. 21C, and thus to generate 6.5% more electricity, as shown in FIG. 21D. Blade C, whose design lift coefficient is optimized in the lengthwise direction, has a 2% higher blade efficiency than blade B and thus generates 1% more electricity than blade B (7.5% more electricity than blade A), as shown in FIG. 21D.

Although Y125, the suction-side convexity YS, or the pressure-side convexity YP is specified by an interpolation curve passing through Y125, the suction-side convexity YS, or the pressure-side convexity YP at each thickness ratio shown in Tables 1 to 3 in the embodiments described above, the wind turbine blade of the present invention is not limited thereto; any interpolation curve passing through the suction-side convexities YS or pressure-side convexities YP shown in Table 1 or 2 at thickness ratios of 21% to 35% may be used. This is because the characteristics of a wind turbine blade are primarily determined in this thickness ratio range.

Although the design tip speed ratio is 8.0 to 8.5 in the embodiments described above, the present invention is not limited thereto; it can also be applied to a design tip speed ratio of, for example, 6.0 to 9.0.

The blade tip region $1c$, the transition region $1e$, and the maximum-chord-length position are not limited to the ranges of dimensionless radial positions or thickness ratios illustrated in the embodiments; they can be changed as long as the advantages of the present invention are provided.

Fourth Embodiment

This embodiment differs from the embodiments described above in that the suction-side profile or the thickness distribution at each radial position (each thickness ratio) is specified such that it is extended or contracted in the Y direction. The other points are similar to those of the first embodiment; therefore, a description thereof is omitted.

A method for specifying the profile of the wind turbine blade 1 having the desired design lift coefficient at each thickness position (or radial position) after the desired design lift coefficient is determined as in FIG. 8C (design-lift-coefficient determining step) will be described. This embodiment is particularly effective in defining the airfoil profile (blade section profile) at each thickness position such that it has substantially the same design lift coefficient.

Method for Determining Suction-Side Profile

Figure 22:
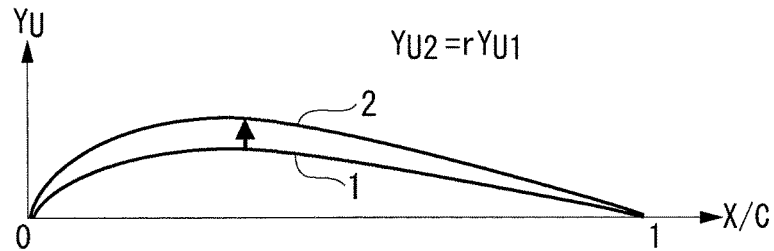
FIG. 22 is a graph illustrating a method for determining a suction-side profile.
Figure 23:
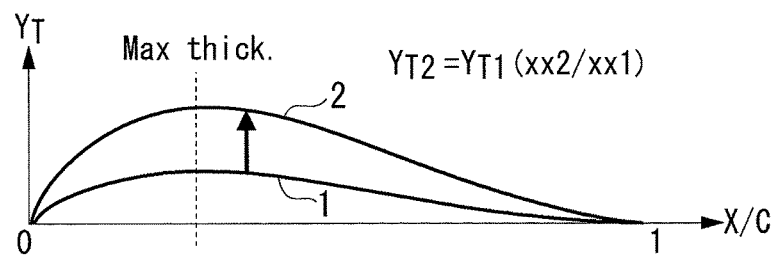
FIG. 23 is a graph illustrating a method for determining a thickness distribution.
Figure 24:
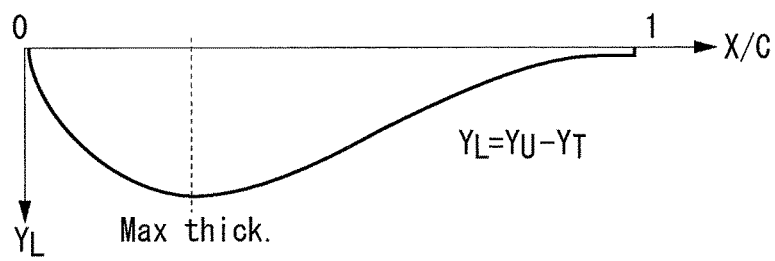
FIG. 24 is a graph illustrating a method for determining a pressure-side profile.
Figure 25:
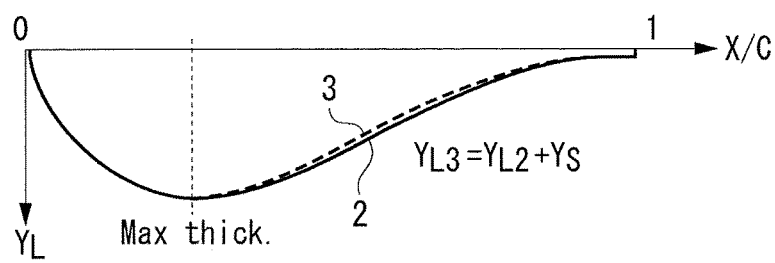
FIG. 25 is a graph illustrating how to determine the amount of adjustment to the pressure-side profile of a trailing edge portion.
Figure 26:
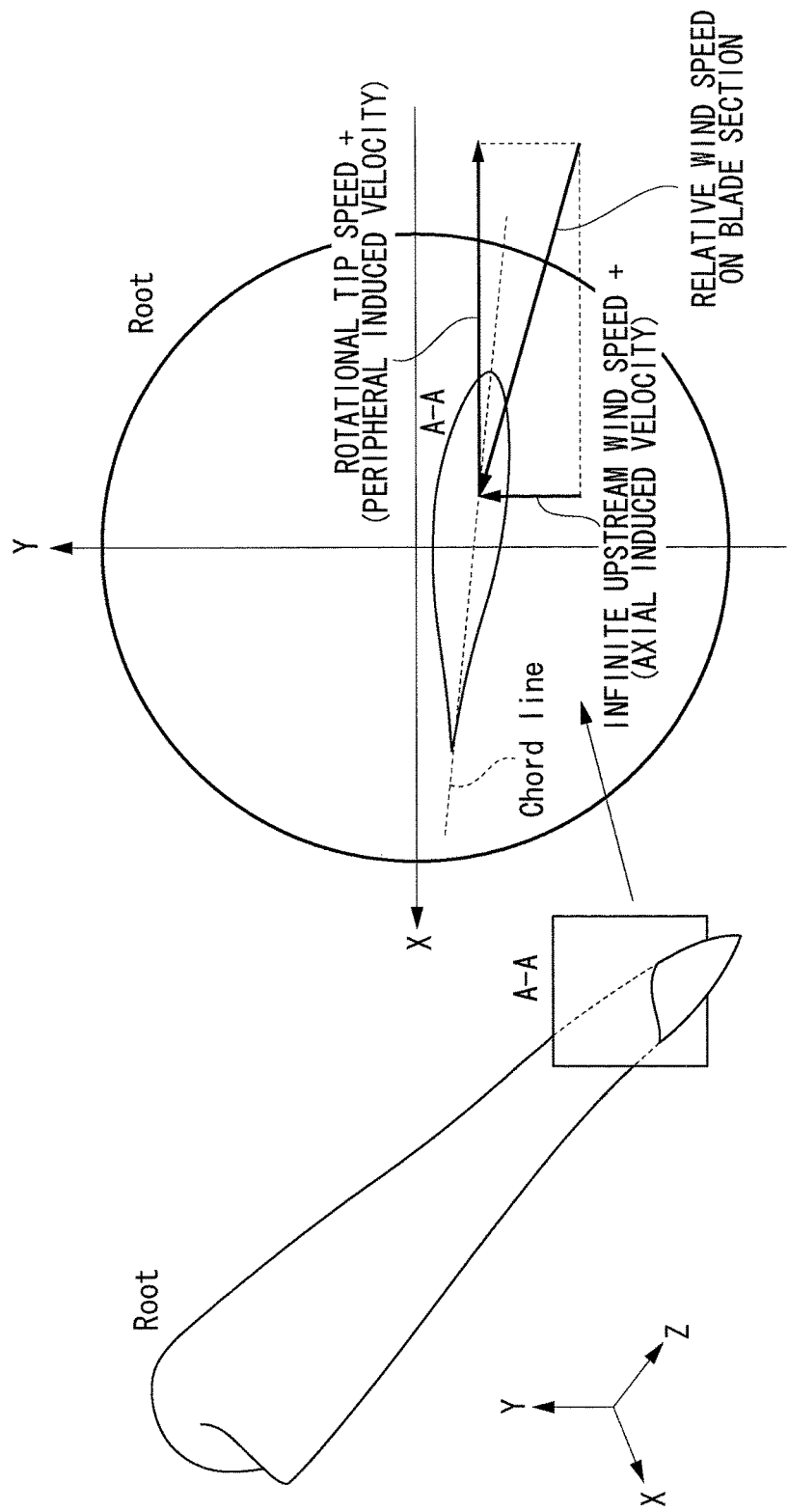
FIG. 26 is a diagram illustrating the definition of the Reynolds number.

The airfoil profile (blade section profile) of the blade body 3 at each thickness position (radial position) is specified such that the airfoil profile has a suction-side profile that is extended or contracted in the Y direction. FIG. 22 illustrates a method for determining the suction-side profile. In FIG. 22, the horizontal axis indicates the chordwise position X/C, which is the distance from the leading edge normalized by dividing it by the chord length C, and the vertical axis is a coordinate $Y_u$, which is the distance from the chord line (horizontal axis) normalized by dividing it by the chord length C. FIGS. 23 to 25, described later, use coordinate systems normalized by dividing them by the chord length C, as does FIG. 22.

As shown in FIG. 22, assuming that a suction-side profile specified by a suction surface coordinate (the distance between the chord position and the suction-side profile) $Y_{u1}$ is a reference suction-side profile, a second suction-side profile at a different thickness position is represented, using a suction surface coordinate $Y_{u2}$, by the following equation:

$$Y_{u2}=r\times Y_{u1} \qquad (4)$$

where r is the extension/contraction ratio, which may be set to any ratio.

Thus, because the airfoil profile (blade section profile) at each thickness position has a suction-side profile that is extended or contracted in the Y direction, a blade profile that delivers comparable aerodynamic performance to the reference suction-side profile can be defined at each thickness position.

Method for Determining Thickness Distribution

FIG. 23 illustrates a method for determining the thickness distribution.

Specifically, the airfoil profile (blade section profile) of the blade body 3 at each thickness position (radial position) is specified such that the airfoil profile has a thickness distribution that is extended or contracted in the Y direction. Specifically, as shown in FIG. 23, assuming that a thickness distribution specified by a thickness $Y_{T1}$ corresponding to the chordwise position X/C is a reference thickness distribution, a second thickness distribution at a different thickness position is represented, using a thickness $Y_{T2}$, by the following equation:

$$Y_{T2}=Y_{T1}\times(xx2/xx1) \qquad (5)$$

where (xx2/xx1) is the extraction/contraction ratio, which may be a preferable ratio of the thickness ratio xxx2 of the second thickness distribution to the thickness ratio xxx1 of the reference thickness distribution.

Thus, because the airfoil profile (blade section profile) at each thickness position has a thickness distribution that is extended or contracted in the Y direction, a blade profile that delivers comparable aerodynamic performance to the reference thickness distribution can be defined at each thickness position.

Method for Determining Pressure-Side Profile

FIG. 24 illustrates a method for determining the pressure-side profile of an airfoil profile (blade section profile).

The leading edge portion extending from the leading edge to the maximum-thickness position (Max thick) has a pressure-side profile determined from the suction-side profile $Y_u$ determined by equation (4) above and the thickness distribution $Y_T$ determined by equation (5) above. Specifically, assuming that the pressure surface coordinate of the pressure-side profile is $Y_L$, the pressure-side profile is represented by the following equation:

$$Y_L=Y_u-Y_T \qquad (6)$$

Thus, because not only is the suction-side profile extended or contracted in the Y direction, but also both the suction-side profile and the thickness distribution of the leading end portion are extended or contracted in the Y direction, a blade profile that delivers comparable aerodynamic performance to the reference suction-side profile can be defined at each thickness position.

In addition, the trailing edge portion extending from the maximum-thickness position to the trailing edge may have a pressure-side profile determined by equation (6) above.

Alternatively, as shown in FIG. 25, the trailing edge portion may have a pressure-side profile defined by adding a predetermined amount of adjustment to the pressure-side profile determined by equation (6) above, which serves as a reference pressure-side profile. This is because the pressure-side profile of the trailing edge portion does not greatly affect the continuity of the airfoil profile (blade section profile). Accordingly, relatively high design flexibility is permitted for the pressure-side profile of the trailing edge portion.

Specifically, assuming that the pressure surface coordinate of the adjusted pressure-side profile is $Y_{L3}$, the pressure surface coordinate of the reference pressure-side profile is $Y_{L2}$, and the amount of adjustment is $Y_s$, the adjusted pressure-side profile is represented by the following equation:

$$Y_{L3}=Y_{L2}+Y_s \qquad (7)$$

Thus, the pressure-side profile of the trailing edge portion can be set to any profile to optimize the design lift coefficient.

The amount of adjustment $Y_s$ can be determined by a quartic function of the chord position x, where the amount of adjustment $Y_s$ is 0 at the maximum-thickness position and the trailing edge, and where the first differential of the pressure surface coordinate that gives the pressure-side profile in the chordwise direction is 0. For example, assuming that the maximum thickness is xx, the maximum-thickness position (X/C) is 0.4, and s is any magnification, the amount of adjustment $Y_s$ is represented by the following equation:

$$Y_s=(xx/100) \times s \times (x-1.0)^2(x-0.4)^2/(0.3^2) \qquad (8)$$

By determining the amount of adjustment by the above equation, the amount of adjustment $Y_s$ can be obtained in a simple manner, and therefore, the desired pressure-side profile can be easily determined.

As discussed above, because the suction-side profile or the thickness distribution of the airfoil profile (blade section profile) at each thickness ratio (each radial position) is extended or contracted in the Y direction in this embodiment, airfoil profiles (blade section profiles) having the desired design lift coefficients can be determined in the radial direction of the wind turbine blade, which improves the performance of the wind turbine blade.

In addition, because a wind turbine blade having airfoil profiles (blade section profiles) that are extended or contracted in the Y direction can be provided, the blade profile continuity can be improved, and therefore, the blade manufacturing yield can be improved.

Figure 27:
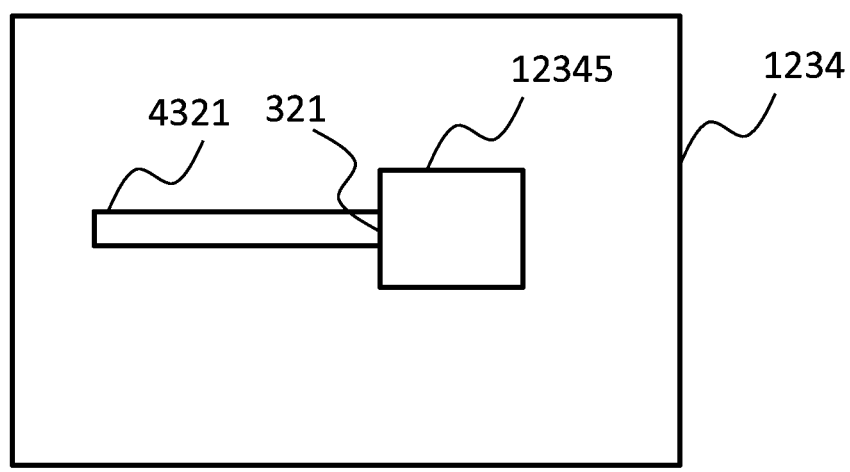
FIG. 27 is a functional black-box diagram of a power generating system.

FIG. 27 is a functional black-diagram depicting a wind power generating system 1234 that includes a wind turbine blade 4321 represented in functional black-box format, and also includes a rotor 12345 connected to a blade root 321 of the wind turbine blade 1234 that is rotated by the wind turbine blade, all presented in functional black-box format.

The invention claimed is:

1. A wind turbine blade comprising:
a blade body whose chord length increases from a blade tip toward a blade root,
the blade body including
a blade tip region located near the blade tip and whose chord length increases gradually toward the blade root, the blade tip region having a first design lift coefficient over the entire blade tip region,
a maximum-chord-length position located near the blade root and having a maximum chord length, the maximum-chord-length position having a second design lift coefficient higher than the first design lift coefficient, and
a transition region extending from the blade tip region to the maximum-chord-length position,
wherein the transition region has a design lift coefficient increasing gradually from the blade tip region to the maximum-chord-length position,
wherein the blade tip region is provided in a range of dimensionless radial positions of 0.5 to 0.95, the dimensionless radial position being a radial position of a blade section divided by a blade radius-that is a distance from the center of rotation of the blade to the blade tip, or is provided in a range of thickness ratios of 12% to 30%, the thickness ratio being a percentage obtained by dividing a maximum thickness by the chord length,
wherein the first design lift coefficient is X±0.10 or X±0.05, wherein X is a median of the first design lift coefficient,
wherein the second design lift coefficient of the maximum-chord-length position is X+0.3±0.2 or X+0.3±0.1, and
wherein the design lift coefficient of the transition region at a central position between an end of the blade tip region facing the blade root and the maximum-chord-length position is X+0.15±0.15 or X+0.15±0.075.

2. The wind turbine blade according to claim 1, wherein the first design lift coefficient is 1.15±0.05,
the second design lift coefficient of the maximum-chord-length position is 1.45±0.1, and
the design lift coefficient of the transition region at a central position between an end of
the blade tip region facing the blade root and the maximum-chord-length position is 1.30±0.075.

3. A wind power generation system comprising:
the wind turbine blade according to claim 1;
a rotor that is connected to the blade root of the wind turbine blade and that is rotated by the wind turbine blade; and
a generator that converts the rotational force generated by the rotor to electrical output power.

4. A wind turbine blade comprising:
a blade body whose chord length increases from a blade tip toward a blade root,
wherein the blade body is represented by a thickness ratio and Y125 which correlates with a design lift coefficient,
the thickness ratio being a percentage obtained by dividing a maximum thickness by the chord length,
Y125 being a percentage obtained by dividing a distance from a chord on a suction side, at a 1.25% position, by the chord length, wherein the position of a leading edge along the chord length is defined as 0% and the position of a trailing edge along the chord length is defined as 100%,
then the blade body has
a Y125 of 2.575±0.13% at a position having a thickness ratio of 21%,
a Y125 of 2.6±0.15% at a position having a thickness ratio of 24%, and
a Y125 of 2.75±0.25% or 2.75±0.20%, or 2.75±0.15%, at a position having a thickness ratio of 30%.

5. The wind turbine blade according to claim 4, wherein Y125 of the blade body in a range of thickness ratios of 21% to 35% is determined by an interpolation curve passing through
the value of Y125 at the position having a thickness ratio of 21%,
the value of Y125 at the position having a thickness ratio of 24%, and the value of Y125 at the position having a thickness ratio of 30%.

6. The wind turbine blade according to claim 4, wherein the blade body has
a Y125 of 2.55±0.1% at a position having a thickness ratio of 18%,
a Y125 of 3.0±0.4% or 3.0±0.25% or 3.0±0.20%, at a position having a thickness ratio of 36%, and
a Y125 of 3.4±0.6% or 3.4±0.4% or 3.4±0.2%, at a position having a thickness ratio of 42%.

7. The wind turbine blade according to claim 6, wherein Y125 of the blade body in a range of thickness ratios of 18% to 42% is determined by an interpolation curve passing through
the value of Y125 at the position having a thickness ratio of 18%,
the value of Y125 at the position having a thickness ratio of 21%,
the value of Y125 at the position having a thickness ratio of 24%,
the value of Y125 at the position having a thickness ratio of 30%,
the value of Y125 at the position having a thickness ratio of 36%, and
the value of Y125 at the position having a thickness ratio of 42%.

8. A wind power generation system comprising:
the wind turbine blade according to claim 4;
a rotor that is connected to the blade root of the wind turbine blade and that is rotated by the wind turbine blade; and
a generator that converts the rotational force generated by the rotor to electrical output power.

9. The wind turbine blade according to claim 4, wherein Y125 is 2.75±0.20% at a position having a thickness ratio of 30%.

10. The wind turbine blade according to claim 4, wherein Y125 is 2.75±0.15%, at a position having a thickness ratio of 30%.

11. A wind turbine blade comprising:
a blade body whose chord length increases from a blade tip toward a blade root,
wherein the blade body is represented by a thickness ratio and a suction-side convexity YS which correlates with a design lift coefficient,
the thickness ratio being a percentage obtained by dividing a maximum thickness by the chord length,
the suction-side convexity YS being a percentage obtained by dividing a distance from a chord on a suction side, at a maximum-thickness position, by the chord length,
then the blade body has
a suction-side convexity YS of 12.0±0.6% at a position having a thickness ratio of 21%,
a suction-side convexity YS of 12.3±0.7% at a position having a thickness ratio of 24%, and
a suction-side convexity YS of 13.3±1.2% or 13.3±1.0% or 13.3±0.8%, at a position having a thickness ratio of 30%.

12. The wind turbine blade according to claim 11, wherein YS of the blade body in a range of thickness ratios of 21% to 35% is determined by an interpolation curve passing through
the value of YS at the position having a thickness ratio of 21%,
the value of YS at the position having a thickness ratio of 24%, and
the value of YS at the position having a thickness ratio of 30%.

13. The wind turbine blade according to claim 11, wherein the blade body has
a YS of 11.7±0.5% at a position having a thickness ratio of 18%,
a YS of 14.6±2.0% or 14.6±1.2% or 14.6±1.0%, at a position having a thickness ratio of 36%, and
a YS of 16.6±3.0% or 16.6±2.0% or 16.6±1.5%, at a position having a thickness ratio of 42%.

14. The wind turbine blade according to claim 13, wherein YS of the blade body in a range of thickness ratios of 18% to 42% is determined by an interpolation curve passing through
the value of YS at the position having a thickness ratio of 18%,
the value of YS at the position having a thickness ratio of 21%,
the value of YS at the position having a thickness ratio of 24%,
the value of YS at the position having a thickness ratio of 30%,
the value of YS at the position having a thickness ratio of 36%, and
the value of YS at the position having a thickness ratio of 42%.

15. A wind power generation system comprising:
the wind turbine blade according to claim 11;
a rotor that is connected to the blade root of the wind turbine blade and that is rotated by the wind turbine blade; and
a generator that converts the rotational force generated by the rotor to electrical output power.

16. A wind turbine blade comprising:
a blade body whose chord length increases from a blade tip toward a blade root,
wherein the blade body is represented by a thickness ratio and a pressure-side convexity YP which correlates with a design lift coefficient,
the thickness ratio being a percentage obtained by dividing a maximum thickness by the chord length,
the pressure-side convexity YP being a percentage obtained by dividing a distance from a chord on a pressure side, at a maximum-thickness position, by the chord length,
then the blade body has
a pressure-side convexity YP of 9.0±0.6% at a position having a thickness ratio of 21%,
a pressure-side convexity YP of 11.7±0.7% at a position having a thickness ratio of 24%, and
a pressure-side convexity YP of 16.7±1.2% or 16.7±1.0% or 16.7±0.8%, at a position having a thickness ratio of 30%.

17. The wind turbine blade according to claim 16, wherein YP of the blade body in a range of thickness ratios of 21% to 35% is determined by an interpolation curve passing through
the value of YP at the position having a thickness ratio of 21%,
the value of YP at the position having a thickness ratio of 24%, and
the value of YP at the position having a thickness ratio of 30%.

18. The wind turbine blade according to claim 16, wherein the blade body has
a YP of 6.3±0.5% at a position having a thickness ratio of 18%, a YP of 21.4±2.0% or 21.4±1.2% or 21.4±1.0%, at a position having a thickness ratio of 36%, and a YP of 25.4±3.0% or 25.4±2.0%, or 25.4±1.5%, at a position having a thickness ratio of 42%.

19. The wind turbine blade according to claim 18, wherein YP of the blade body in a range of thickness ratios of 18% to 42% is determined by an interpolation curve passing through
the value of YP at the position having a thickness ratio of 18%,
the value of YP at the position having a thickness ratio of 21%,
the value of YP at the position having a thickness ratio of 24%,
the value of YP at the position having a thickness ratio of 30%,
the value of YP at the position having a thickness ratio of 36%, and
the value of YP at the position having a thickness ratio of 42%.

20. A wind power generation system comprising:
the wind turbine blade according to claim 16;
a rotor that is connected to the blade root of the wind turbine blade and that is rotated by the wind turbine blade; and
a generator that converts the rotational force generated by the rotor to electrical output power.

21. A wind turbine blade comprising:
a blade body whose chord length decreases from a blade root toward a blade tip in a radial direction,
wherein
the blade body has a plurality of airfoil profiles at a plurality of radial positions, and
when a suction-side profile of one of the plurality of airfoil profiles is defined as a reference suction-side profile, each of the suction-side profiles of the rest of the plurality of the airfoil profiles is a profile of extending or contracting the reference suction-side profile in a Y direction perpendicular to a chordwise direction.

22. The wind turbine blade according to claim 21, wherein the airfoil profile of the blade body at each of the plurality of the radial positions has a chordwise thickness distribution that is extended or contracted in the Y direction.

23. The wind turbine blade according to claim 21, wherein a leading edge portion, extending from a leading edge to a maximum-thickness position, of the airfoil profile of the blade body at each of the plurality of the radial positions has a chordwise thickness distribution that is extended or contracted in the Y direction and a pressure-side profile determined from the thickness distribution and the suction-side profile.

24. A wind power generation system comprising:
the wind turbine blade according to claim 21;
a rotor that is connected to the blade root of the wind turbine blade and that is rotated by the wind turbine blade; and
a generator that converts the rotational force generated by the rotor to electrical output power.

25. A wind turbine blade having a blade section having:
a maximum-thickness position having a maximum thickness in a range of chordwise positions X/C of 0.28 to 0.32, the chordwise position X/C being a distance X, from a leading edge along a chord line, divided by a chord length C, and
a maximum-camber position having a maximum camber in a range of chordwise positions X/C of 0.45 to 0.55
wherein the blade section is provided in a blade tip region located near the blade tip, the blade tip region being in a range of thickness ratios of 12% to 21%, and the thickness ratio is the maximum thickness divided by the chord length.

26. The wind turbine blade according to claim 25, wherein a camber distribution is symmetrical with respect to the maximum-camber position in the chordwise direction.

27. A wind power generation system comprising:
the wind turbine blade according to claim 25;
a rotor that is connected to the blade root of the wind turbine blade and that is rotated by the wind turbine blade; and
a generator that converts the rotational force generated by the rotor to electrical output power.

28. A method for designing a wind turbine blade including a blade body whose chord length increases from a blade tip toward a blade root, the method comprising:
assigning a first design lift coefficient to the entirety of a blade tip region located near the blade tip of the blade body and whose chord length increases gradually toward the blade root;
assigning a second design lift coefficient higher than the first design lift coefficient to a maximum-chord-length position located near the blade root of the blade body and having a maximum chord length; and
assigning a design lift coefficient, which increases gradually between the blade tip region and the maximum-chord-length position in a direction from the blade tip toward the blade root, to a transition region extending from the blade tip region to the maximum-chord-length position,
wherein:
the blade tip region is provided in a range of dimensionless radial positions of 0.5 to 0.95, the dimensionless radial position being a radial position of a blade section divided by a blade radius-that is a distance from the center of rotation of the blade to the blade tip, or is provided in a range of thickness ratios of 12% to 30%, the thickness ratio being a percentage obtained by dividing a maximum thickness by the chord length,
X is a median of the first design lift coefficient,
the first design lift coefficient is X±0.10 or X±0.05, and,
the second design lift coefficient of the maximum-chord-length position is X+0.3±0.2 or X+0.3±0.1, and
the design lift coefficient of the transition region at a central position between an end of the blade tip region facing the blade root and the maximum-chord-length position is X+0.15±0.15 or X+0.15±0.075.

29. A method for designing a wind turbine blade including a blade body whose chord length increases from a blade tip toward a blade root, the method comprising:
a design-lift-coefficient determining step of determining a design lift coefficient at each of a plurality of blade sections of the blade body; and
a Y125-determining step of determining Y125 which correlates with the design-lift-coefficient such that the design lift coefficient determined in the design-lift-coefficient determining step is satisfied, Y125 being a percentage obtained by dividing a distance from a chord on a suction side, at a 1.25% position, by the chord length,
wherein the position of a leading edge along the chord length is defined as 0% and the position of a trailing edge along the chord length is defined as 100%,
then the blade body has a Y125 of 2.575±0.13% at a position having a thickness ratio of 21%,
a Y125 of 2.6±0.15% at a position having a thickness ratio of 24%, and
a Y125 of 2.75±0.25% or 2.75±0.20% or 2.75±0.15%, at a position having a thickness ratio of 30%.

30. A method for designing a wind turbine blade including a blade body whose chord length increases from a blade tip toward a blade root, the method comprising:
a design-lift-coefficient determining step of determining a design lift coefficient at each of a plurality of blade sections of the blade body; and
a YS-determining step of determining a suction-side convexity YS which correlates with the design-lift-coefficient such that the design lift coefficient determined in the design-lift-coefficient determining step is satisfied, the suction-side convexity YS being a percentage obtained by dividing a distance from a chord on a suction side, at a maximum-thickness position, by the chord length,
then the blade body has
a suction-side convexity YS of 12.0±0.6% at a position having a thickness ratio of 21%,
a suction-side convexity YS of 12.3±0.7% at a position having a thickness ratio of 24%, and
a suction-side convexity YS of 13.3±1.2% or 13.3±1.0% or 13.3±0.8%, at a position having a thickness ratio of 30%.

31. A method for designing a wind turbine blade including a blade body whose chord length increases from a blade tip toward a blade root, the method comprising:
a design-lift-coefficient determining step of determining a design lift coefficient at each of a plurality of blade sections of the blade body; and
a YP-determining step of determining a pressure-side convexity YP which correlates with the design-lift-coefficient such that the design lift coefficient determined in the design-lift-coefficient determining step is satisfied, the pressure-side convexity YP being a percentage obtained by dividing a distance from a chord on a pressure side, at a maximum-thickness position, by the chord length,
then the blade body has
a pressure-side convexity YP of 9.0±0.6% at a position having a thickness ratio of 21%,
a pressure-side convexity YP of 11.7±0.7% at a position having a thickness ratio of 24%, and
a pressure-side convexity YP of 16.7±1.2% or 16.7±1.0% or 16.7±0.8%, at a position having a thickness ratio of 30%.

32. A method for designing a wind turbine blade including a blade body whose chord length decreases from a blade root toward a blade tip in a radial direction, the method comprising:
specifying a plurality of airfoil profiles of the blade body at a plurality of radial positions so that, when a suction-side profile of one of the plurality of airfoil profiles is defined as a reference suction-side profile, each of the suction-side profiles of the rest of the plurality of the airfoil profiles is a profile of extending or contracting the reference suction-side profile in a Y direction perpendicular to a chordwise direction.

33. The method for designing a wind turbine blade according to claim 32, the method further comprising:
specifying a leading edge portion, extending from a leading edge to a maximum-thickness position, of the airfoil profile of the blade section at each of the plurality of the radial positions so that the leading edge portion has a chordwise thickness distribution that is extended or contracted in the Y direction and a pressure-side profile determined from the thickness distribution and the suction-side profile.

34. The method for designing the wind turbine blade according to claim 33, wherein a trailing edge portion extending from the maximum-thickness position to a trailing edge is specified such that the trailing edge portion has a pressure-side profile defined by adding a predetermined amount of adjustment to a reference pressure-side profile determined from the suction-side profile and the thickness distribution.

35. The method for designing the wind turbine blade according to claim 34, wherein the amount of adjustment is determined by a quartic function of chord position, wherein the amount of adjustment is 0 at the maximum-thickness position and the trailing edge, and wherein a first differential of a pressure surface coordinate that gives the pressure-side profile in the chordwise direction is 0.

36. The method for designing a wind turbine blade according to claim 32, the method further comprising:
specifying the airfoil profile of the blade body at each of the plurality of the radial positions so that the airfoil profile has a chordwise thickness distribution that is extended or contracted in the Y direction.

37. A method for designing a wind turbine blade, comprising:
providing a maximum-thickness position having a maximum thickness in a range of chordwise positions X/C of 0.28 to 0.32, the chordwise position X/C being a distance X, from a leading edge along a chord line, divided by a chord length C, and
providing a maximum-camber position having a maximum camber in a range of chordwise positions X/C of 0.45 to 0.55,
providing the blade section in a blade tip region located near the blade tip, the blade tip region being in a range of thickness ratios of 12% to 21%, and the thickness ratio is the maximum thickness divided by the chord length.

* * * * *